(12) United States Patent
Hoefler et al.

(10) Patent No.: US 8,176,483 B2
(45) Date of Patent: May 8, 2012

(54) SOFTWARE MAINTENANCE MANAGEMENT

(75) Inventors: Dorothea Hoefler, Sinsheim (DE); Jan Jansen, Sinsheim (DE); Herbert Stegmueller, Bruchsal (DE); Laicher Karolin, Rauenbereg (DE); Xiaolong Chen, Nanjing (CN); Chongyao Wang, Shanghai (CN); Xue Bai, Shanghai (CN)

(73) Assignee: SAP AG, Walldorf (DE)

( * ) Notice: Subject to any disclaimer, the term of this patent is extended or adjusted under 35 U.S.C. 154(b) by 1071 days.

(21) Appl. No.: 11/324,734

(22) Filed: Dec. 30, 2005

(65) Prior Publication Data
US 2007/0157192 A1    Jul. 5, 2007

(51) Int. Cl.
*G06F 9/44* (2006.01)
*G06F 9/455* (2006.01)

(52) U.S. Cl. .................. 717/173; 717/171; 717/174
(58) Field of Classification Search .................. None
See application file for complete search history.

(56) References Cited

U.S. PATENT DOCUMENTS

| | | | |
|---|---|---|---|
| 6,177,932 B1 | 1/2001 | Galdes et al. | |
| 7,353,509 B2* | 4/2008 | Sheehy | 717/174 |
| 7,392,520 B2* | 6/2008 | de Heer et al. | 717/171 |
| 7,493,613 B2* | 2/2009 | D'Souza et al. | 717/173 |
| 7,516,450 B2* | 4/2009 | Ogura | 717/168 |
| 7,584,467 B2* | 9/2009 | Wickham et al. | 717/171 |
| 8,065,673 B2* | 11/2011 | D'Souza et al. | 717/173 |
| 2003/0204791 A1* | 10/2003 | Helgren et al. | 714/48 |
| 2004/0003266 A1* | 1/2004 | Moshir et al. | 713/191 |
| 2004/0015953 A1* | 1/2004 | Vincent | 717/173 |
| 2004/0187103 A1* | 9/2004 | Wickham et al. | 717/168 |
| 2004/0243996 A1* | 12/2004 | Sheehy et al. | 717/174 |
| 2005/0022177 A1* | 1/2005 | McCaleb et al. | 717/171 |
| 2005/0153778 A1* | 7/2005 | Nelson et al. | 463/42 |
| 2007/0050678 A1* | 3/2007 | Estes et al. | 714/38 |

OTHER PUBLICATIONS

Wu et al., Lightweight deployment-aware scheduling for wireless sensor networks, Dec. 2005, pp. 837-852, <http://delivery.acm.org/10.1145/1170000/1160129/p837-wu.pdf>.*
Shankaran et al., A framework for (re)deploying components in distributed real-time and embedded systems, Apr. 2006, pp. 737-738, <http://delivery.acm.org/10.1145/1150000/1141446/p737-shankaran.pdf>.*
Gustafsson et al., Dynamic on-demand updating of data in real-time database systems, Mar. 2004, pp. 846-853, <http://delivery.acm.org/10.1145/970000/968074/p846-gustafsson.pdf>.*

* cited by examiner

*Primary Examiner* — Thuy Dao
(74) *Attorney, Agent, or Firm* — Fish & Richardson P.C.

(57) ABSTRACT

A data collection and/or monitoring service residing at a client system collects and sends client system information to a backend system. The client system information is used to update a maintained repository of client system information that is associated with software installed at the client system. The maintained repository is used to determine one or more software update recommendations which are sent to the client system. In response to a trigger event, one or more software updates associated with the update recommendations are automatically downloaded and deployed at the client system. The download and deployment of software updates can be scheduled at the client system.

21 Claims, 20 Drawing Sheets

SOFTWARE MAINTENANCE MANAGEMENT

TECHNICAL FIELD

The disclosed embodiments are related to software maintenance management.

BACKGROUND

Information Technology (IT) departments are overwhelmed with various reactive support tasks and have limited resources and operating budgets to handle those support tasks. Support tasks typically include monitoring for system failures, checking and clearing log files, installing patches and updates, running backup and recovery procedures, managing and assisting end users, responding to service requests, etc.

One task that is particularly difficult for IT departments is software maintenance management. Software maintenance management typically includes checking regularly for new relevant software updates and patches for applications and operating systems, planning for the implementation of new updates (e.g., reading guides and notes to determine prerequisites and dependencies), and manually downloading, unpacking and deploying new updates, corrections, etc. Many of these tasks are time consuming and require significant IT resources to complete. Moreover, the practice of manually downloading, unpacking and deploying updates can be complicated and error prone.

SUMMARY

The deficiencies of conventional manual software maintenance management solutions are overcome by the disclosed embodiments. In some embodiments, a data collection and/or monitoring service residing at a client system automatically collects and sends client system information to a backend system. The client system information is used to update a maintained repository of client system information associated with software installed at the client system. The maintained repository is used to determine one or more software update recommendations which are sent to the client system. In response to a trigger event (e.g., a user request at the client system), one or more software updates associated with the update recommendations are automatically downloaded and deployed at the client system. In some embodiments, the client system is automatically and/or manually prepared prior to deployment. In some embodiments, one or more preprocessing and/or post-processing tasks are automatically performed before and after deployment, respectively. In some embodiments, the download and deployment of software updates can be scheduled at the client system. In some embodiments, instructions for manually performing preparation, preprocessing and post-processing tasks are automatically sent to the client system to assist the user in performing such tasks.

In some embodiments, a method of updating software installed on a system includes: receiving information describing a change to software installed on the system; updating a maintained repository of system information using the received information; determining one or more update recommendations, wherein at least one update recommendation is based on information from the updated repository; sending one or more update recommendations to the system; and automatically downloading to the system one or more software updates associated with the update recommendations in response to a trigger event.

In some embodiments, a method of updating software installed on a system includes: determining one or more update recommendations in response to a trigger event, wherein at least one update recommendation is based on information associated with how the software is configured on the system; sending one or more update recommendations to the system; and automatically downloading to the system one or more software updates associated with the update recommendations.

In some embodiments, a method of updating software installed on a system includes: scheduling a date and time for downloading to the system one or more software updates associated with update recommendations; at the scheduled date and time, automatically downloading to the system one or more software updates associated with update recommendations; and automatically deploying the software updates.

Other embodiments are disclosed that are directed to systems, computer-readable mediums and apparatuses.

DETAILED DESCRIPTION

System Overview

Figure 1:
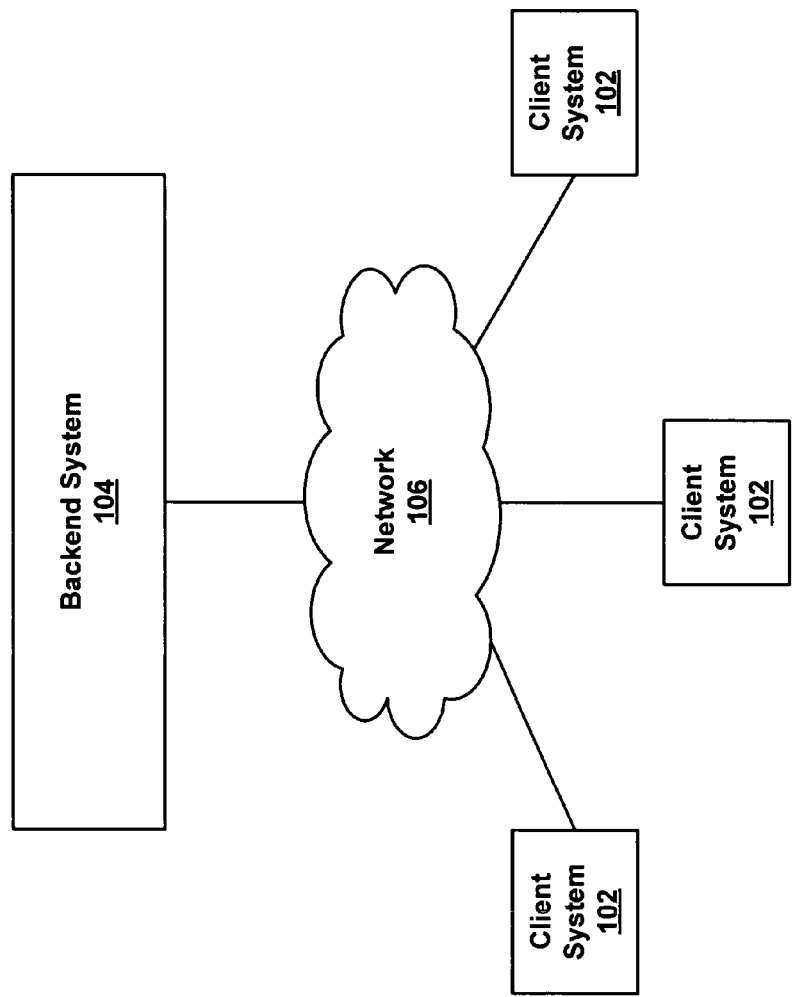
FIG. 1 is a block diagram of an embodiment of a software maintenance management system.

FIG. 1 is a block diagram of an embodiment of a software maintenance management system 100. The system 100 includes one or more client systems 102 and a backend system 104, which are operatively coupled to a network 106 (e.g., Internet, intranet, local area network, Ethernet, wireless network, telephone network, etc.). The client systems 102 can be any systems that use or deploy software. The maintained software can be a single application or an operating system, or a collection of software applications or software components that perform various tasks in a larger system or application, such as a business application suite (e.g., customer relationship management (CRM), business administration, financial, manufacturing, etc.).

In some embodiments, the backend system 104 is integrated with the client systems 102 through the network 106, which can be configured to facilitate continuous or periodic data exchange between the backend system 104 and the client systems 102 using known networking protocols (e.g., TCP/IP, HTTP, etc.).

From time to time, system information (e.g., status, configuration, etc.) associated with the client systems 102 is transmitted to the backend system 104. In some embodiments, the backend system 104 requests system information from the clients 102 on a scheduled basis using, for example, a polling scheme. In other embodiments, the client systems 102 send information to the backend system 104 continuously or periodically, or in response to one or more trigger events.

In some embodiments, the client systems 102 include various embedded services, including but not limited to: an integrated operations handbook, automated health checks, software maintenance management, incident management, etc. The integrated operations handbook can include automated task and incident handling and a central administration console for operational management. The automated health check service can provide users (e.g. IT administrators) with instant access to information and eliminate the need for manual monitoring. The incident management service can be integrated with the backend system 104 and can provide end user support and automated context collection for resolving incidents. The software maintenance management service provides one-click update installation triggered by health checks or other data collection/monitoring services, and also provides proactive notification of updates available for download, as described more fully with respect to FIGS. 2-18.

The system 100 described above is exemplary and other configurations, arrangements and network topologies for the system 100 are possible, including more or fewer clients 102 and/or multiple backend systems 104.

Process Overview

Figure 2:
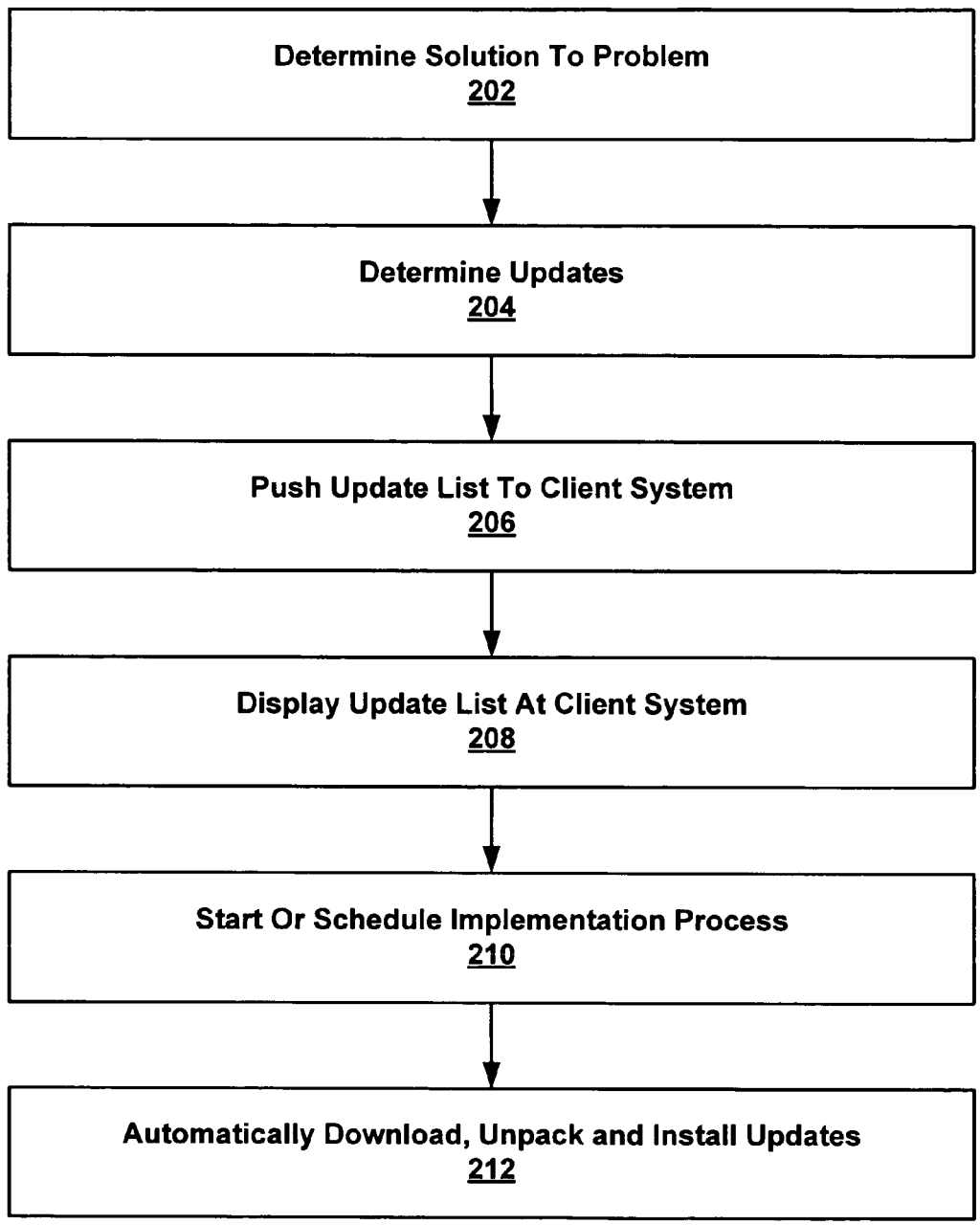
FIG. 2 is a flow diagram of an embodiment of a software maintenance management process.

FIG. 2 is a block diagram of an embodiment of a software maintenance management process 200. Generally, the process 200 handles error corrections, updates, software packages and any other changes to software residing on the client system 102 (hereinafter, also referred to as "updates").

In some embodiments, the process 200 begins when the operator of a client system (e.g., an IT administrator) identifies a problem with software running on the client system, then notifies the service provider responsible for maintaining the software of the problem. In other embodiments, the process 200 begins when the service provider identifies a problem with software running on the client system while monitoring the software on the client system. In still other embodiments, the process 200 begins when there is a new software update available that is independent of any specific customer problems which has been made available to the installed customer base (e.g., new features, enhancements to existing features, etc.).

In some embodiments, after being notified of a problem the service provider determines a solution to the problem (202). The solution can include identifying existing software updates (e.g., "patches") or developing new patches to solve the problem (204). A backend system pushes a list or queue of update recommendations to the client system (206). In some embodiments, the service provider develops or identifies updates based at least in part on client system information which it receives from the client system from time to time. The system information (e.g., health status, configuration changes, versions, system landscape data, etc.) can be provided by a monitoring or data collection service running on the client system. For example, the service provider may need to know what software components and versions are running on the client system before corrective updates can be determined. In some embodiments, the backend system maintains a database of system information, which is updated each time new system information is received at the backend.

In some embodiments, the update recommendations are displayed at the client system (208). For example, the update recommendations can appear as work items on a work list, which can be displayed at an administrator console, as described with respect to FIG. 7. The IT administrator can then view information about the recommended updates and any preprocessing tasks (manual or automatic) that need to be performed before the update can be deployed. If the IT administrator desires to deploy the update, the IT administrator can start the deployment of one or more updates immediately, or schedule deployment of one or more updates for another time (hereinafter, also referred to as "planning").

Figure 3:
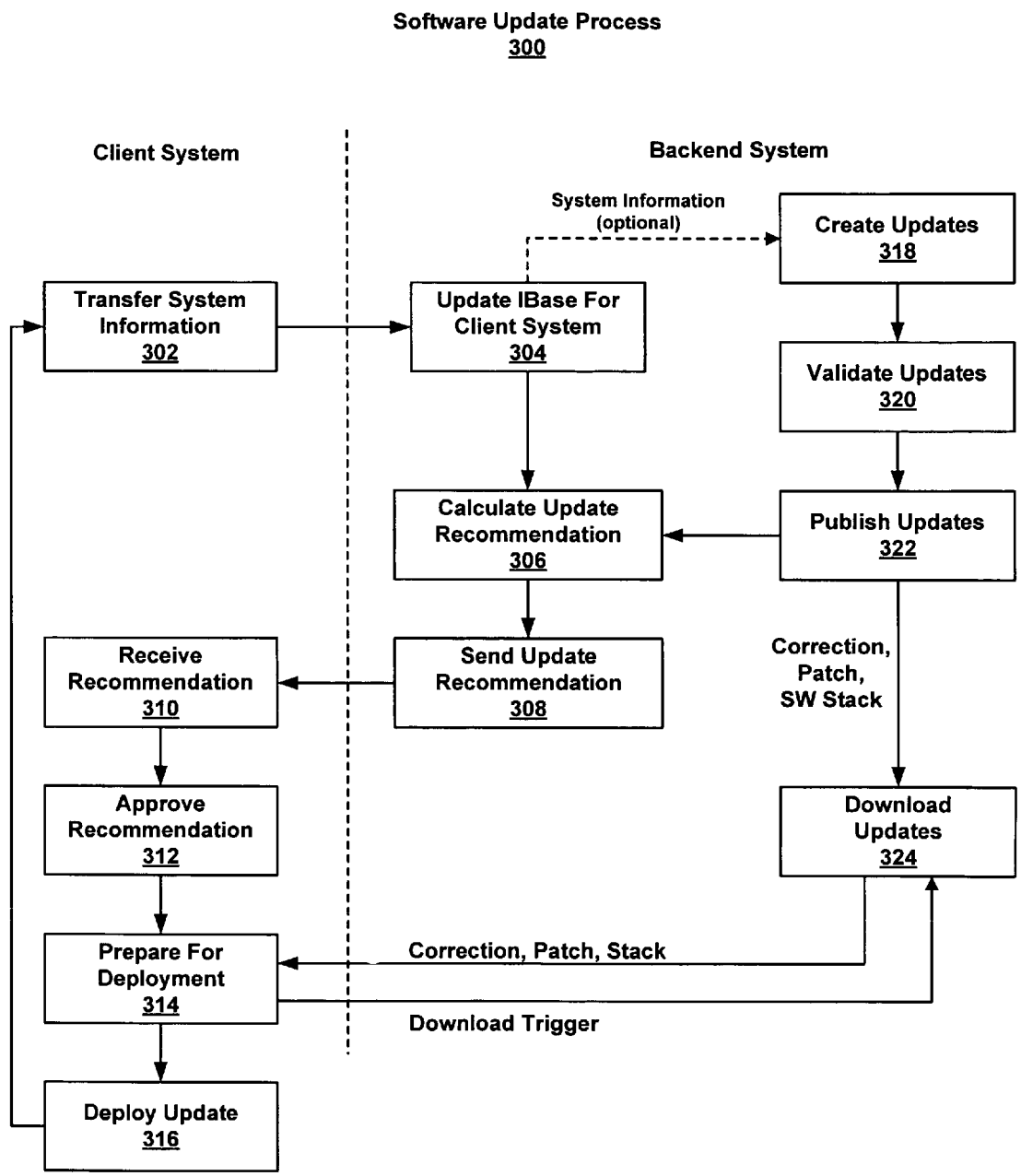
FIG. 3 is a flow diagram of an embodiment of a software update process.
Figure 4:
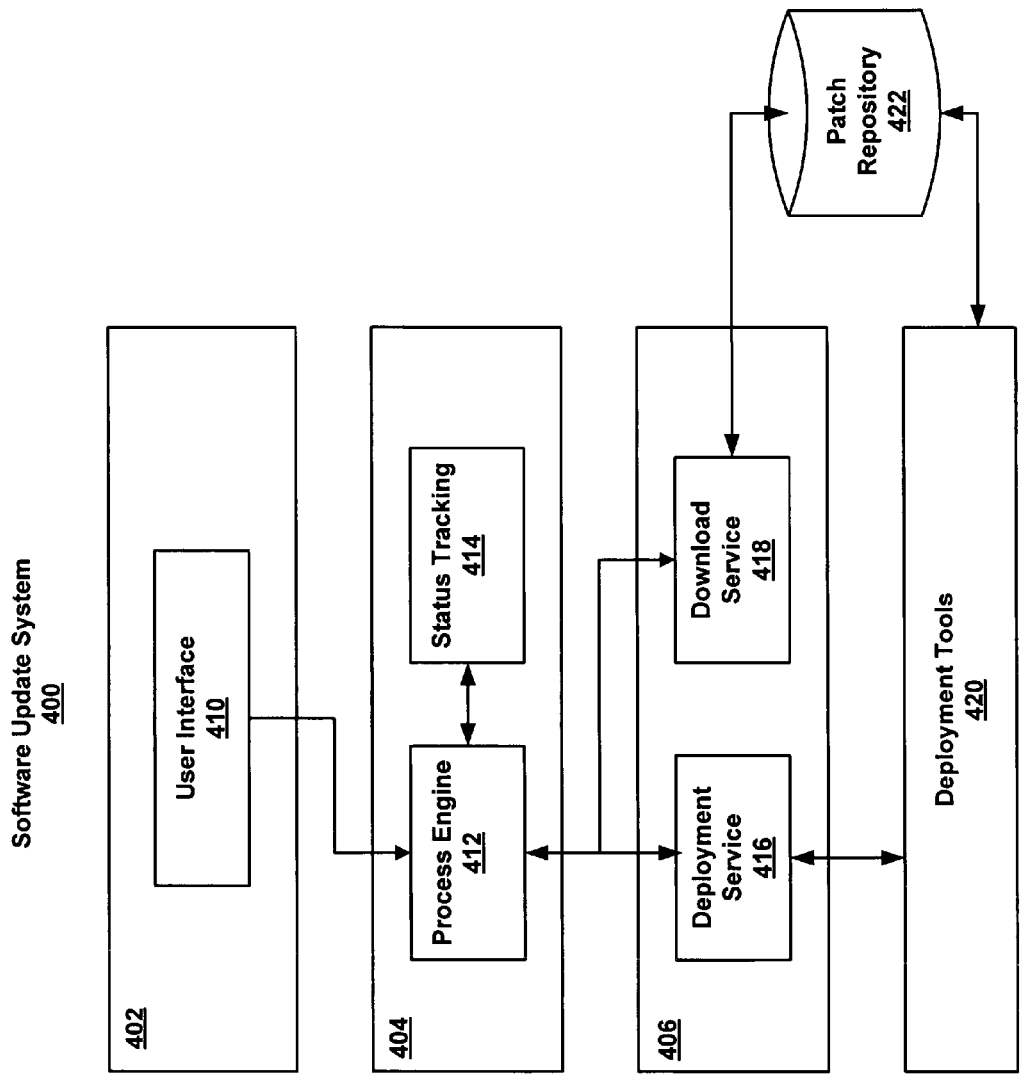
FIG. 4 is a block diagram of an embodiment of a software update system.

In response to a trigger event (e.g., a deployment request from a client system), the client system invokes download and deployment services to automatically download, unpack and install updates on the client system (210), as described with respect to FIGS. 3 and 4. In some embodiments, the client system invokes a download service at the client system, which communicates with a download manager at the backend system for downloading the updates.

Software Update Process

FIG. 3 is a flow diagram of an embodiment of a software update process 300. The steps of process 300 are not necessarily performed in any specific order, and at least some of the steps can be implemented in parallel in a multi-threading or parallel processing environment.

In some embodiments, there are at least three triggers for the process 300. A first trigger occurs when new updates/patches are published as available at the backend system. For example, a service or background process at the backend system identifies a client system for which the published updates are relevant. A second trigger occurs when there is a change to the client system (e.g., software changes, business configuration/usage changes, etc.). The third trigger occurs when an incident is created by a client system. In this third scenario, a software update may be a solution to the incident.

On a client system, one or more data collection and/or monitoring services collect and transfer system information to the backend system (302). The system information can be sent continuously or periodically, or in response to a trigger event initiated at the client system or the backend system. System information includes any information associated with a client system, including but not limited to any information related to: system components and processes, project scenarios, business configuration, system usage (e.g., used functionality), operation and system configurations, system status, product versions, software component vector including support package level, previously installed updates, health monitoring, incidents, etc.

In some embodiments, a data collection and/or monitoring service performs regular data exchange between the client system and the backend system using one or more known communication protocols (e.g., HTTP, TCP/IP, Extensible Mark Up Language (XML) messages, etc.). The service can run in the background on the client system (e.g., daemon process). The network connection can be established directly between the service and the backend system or indirectly through a third party system. In some embodiments, the service collects information from different sources at the client system (e.g., applications, user interface, databases, operating system, etc.) and centralizes the information at common storage location (e.g., in a buffer) at the client system before sending the information to the backend system (e.g., asynchronously).

The backend system receives the system information and updates a maintained repository of client system information (hereinafter also referred to as an "installed base" or "IBase")

(304). Using information contained in the IBase, the backend system determines one or more update recommendations (306) for the client system.

In some embodiments, the update recommendations are software patches or corrections that are created (318), validated (320) and published (322) by the service provider (or a third party). The patches or corrections can be created based on current information in an IBase. The update recommendations can include control information for downloading one or more patches from a patch repository and deploying the patches on the client system. In some embodiments, the update recommendations are calculated in response to one or more manual or automatic trigger events (e.g., an update to the installed base after a software package has been published, etc.). After determination of the update recommendations, the update recommendations are transformed into an appropriate format (e.g., XML) and sent to the client system (308).

Figure 7:
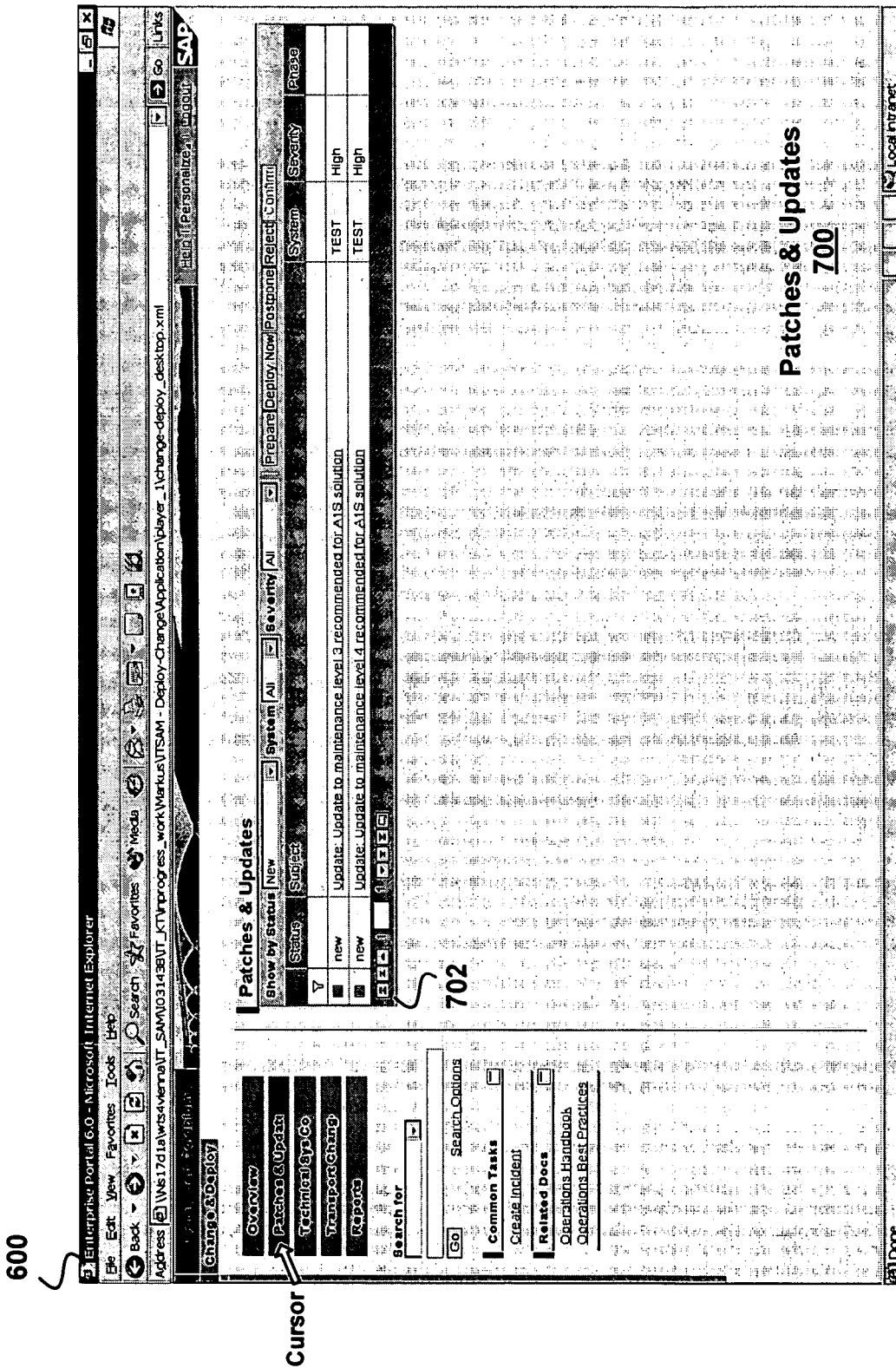

In some embodiments, the update recommendations are received (310) and displayed in a user interface (e.g., a web page) at the client system, such as the user interface described with respect to FIG. 7. The user chooses how to proceed with the update recommendations (312). For example, an IT administrator can choose to reject, postpone, deploy or schedule the download and deployment of all or some of the recommended updates. If the update recommendations are approved (e.g., a decision to deploy immediately or schedule deployment), then the updates (patches) are automatically downloaded (324). The client system is then prepared for deployment (314) and the update is deployed (316). In some embodiments, one or more preprocessing steps are performed after download and prior to deployment (e.g., unpacking components, checking for errors, performing optimization procedures, etc.). These preparation and preprocessing steps can be performed manually (e.g., by the IT administrator), automatically (e.g., by the backend and/or client systems), or as a combination of manual and automatic steps.

Figure 6:
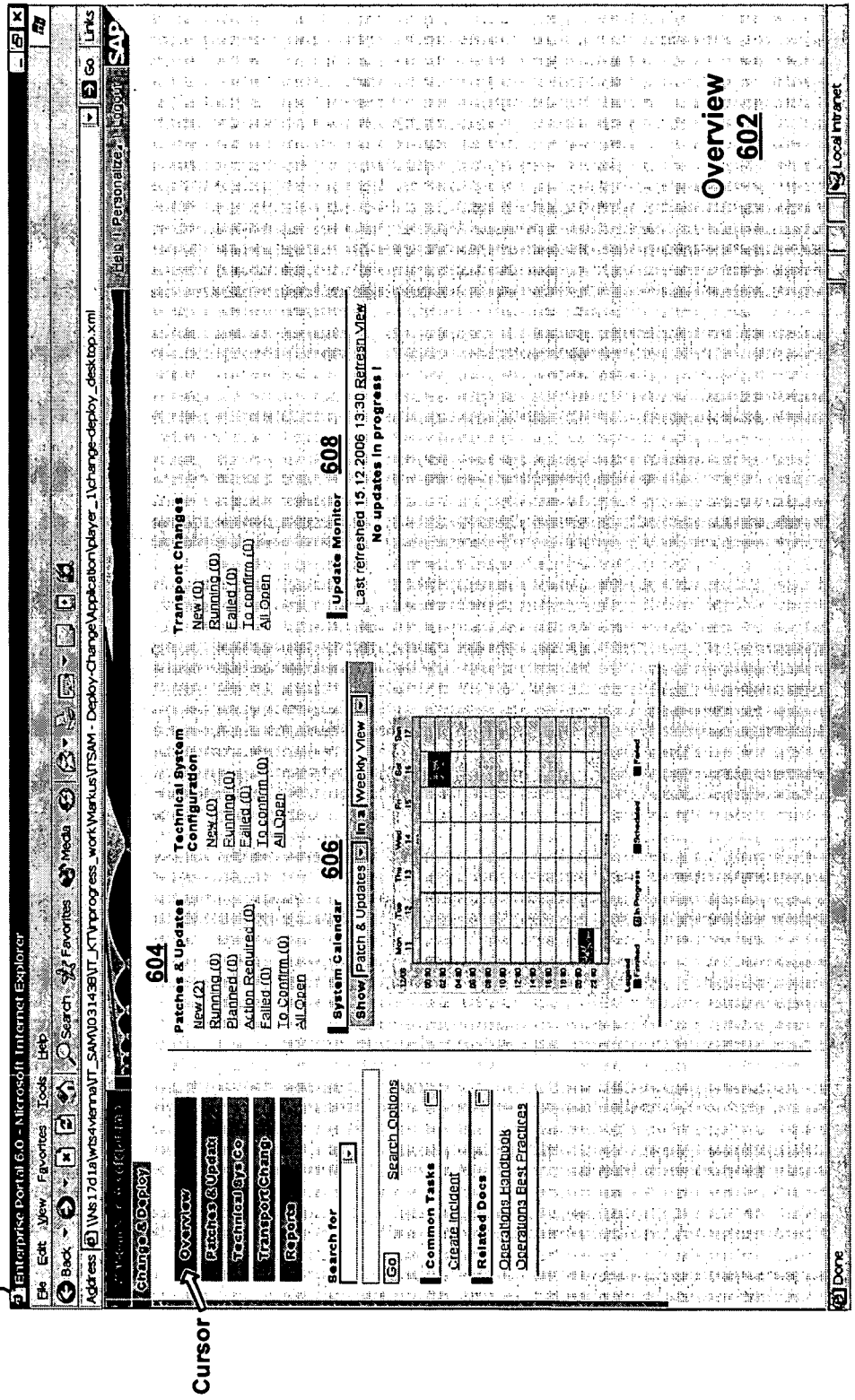
FIGS. 6-17 are screen shots of an embodiment of a user interface for the update management process shown in FIGS. 5A and 5B.

In some embodiments, the user can plan the time of download and/deployment, as described with respect to FIG. 6.

Software Update System

FIG. 4 is a block diagram of an embodiment of a software update system 400 for the backend system 104. The architecture 400 includes one or more software layers, each including one or more software components for performing various tasks associated with the software maintenance process 300. In some embodiments, the software layers include a user interface layer 402, an application layer 404 and a service layer 406. The user interface layer 402 includes various software components for generating a user interface 410, including the screen shots shown in FIGS. 6-17, and presenting the user interface 410 at the client system 102. In some embodiments, the user interface 410 is presented as a web page which is served by a web server at the backend system, which can then be viewed through a browser (e.g., Microsoft Internet Explorer®). In other embodiments, an application or service running on the client system 102 generates the user interface 410 using information sent from the backend system 104, which can be accessed through an application program interface (API) or other hook into the backend system 104 (e.g., a web portal).

When an IT administrator approves an update recommendation, that approval is sent to a process engine 412 in the application layer 404. The process engine 412 manages the download, preparation and deployment of updates on the client system 102. In some embodiments, a status tracking module 414 provides the process engine 412 with status information (e.g., tasks completed, runtime errors, etc.) associated with the process 300.

In some embodiments, the process engine 412 calls a download service 418 and a deployment service 416 in the service layer 406 to carry out the download and deployment tasks. The deployment service 416 can invoke various deployment tools 420 for performing deployment services (e.g., unpacking, error checking, etc.). In some embodiments, the deployment tools can access a patch repository 422 to retrieve information and updates for use in deployment services. The download service 418 can also access the patch repository 422 for retrieving updates and information related to download and deployment services.

It should be apparent that the architecture 400 is exemplary, and other architectures can be used that have more or fewer components, layers, etc. The various components of the architecture 400 can be located at the backend system 104 and/or the client system 102. In some embodiments, the architecture 400 is implemented on the client system 102 and "pulls" software updates from the backend system 104. In some embodiments, the process 300 is implemented by a single program or application or by one or more components of an operating system.

Update Management Process

Figure 5A:
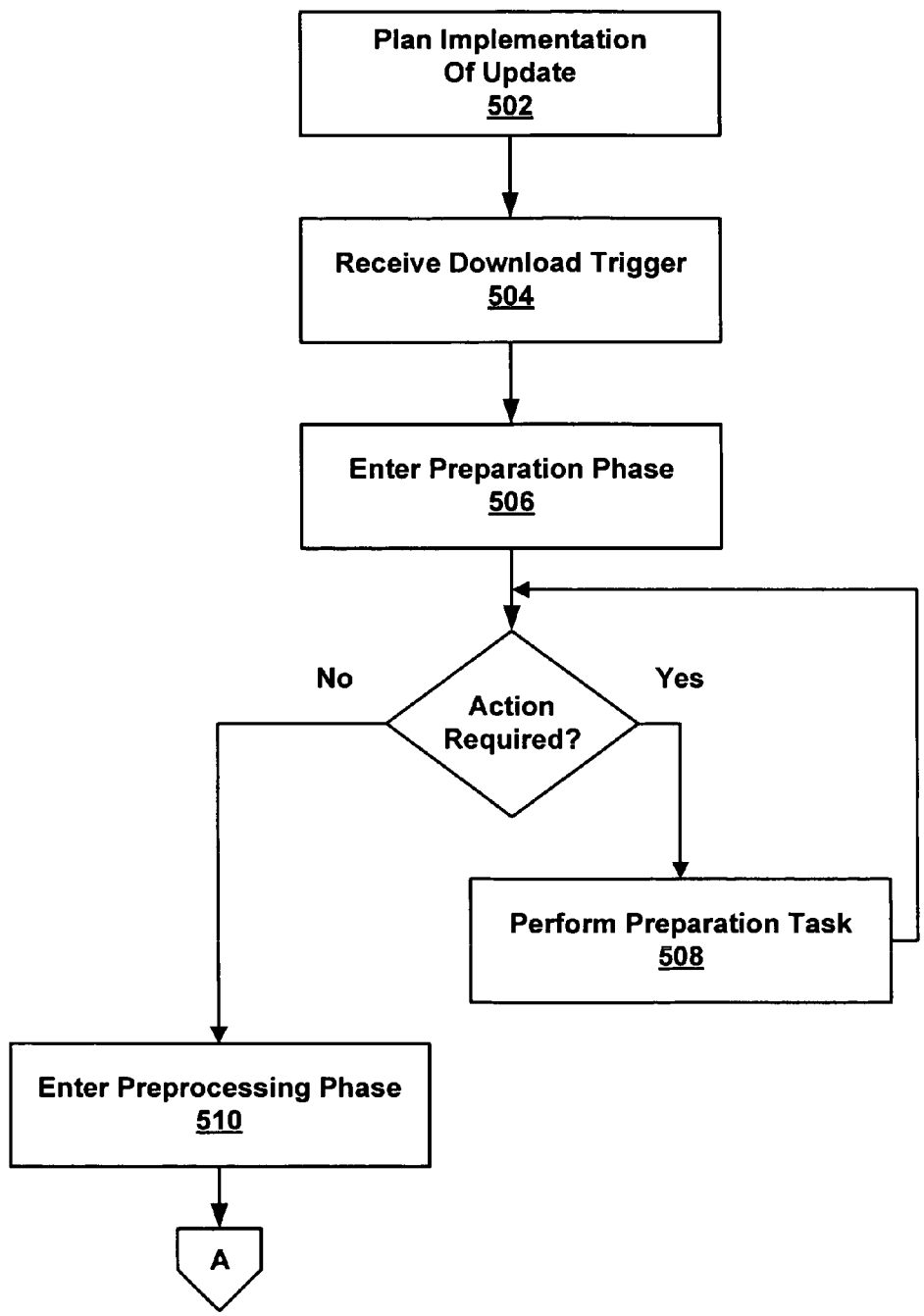
FIGS. 5A and 5B are flow diagrams of an embodiment of an update management process at the client system.
Figure 5B:
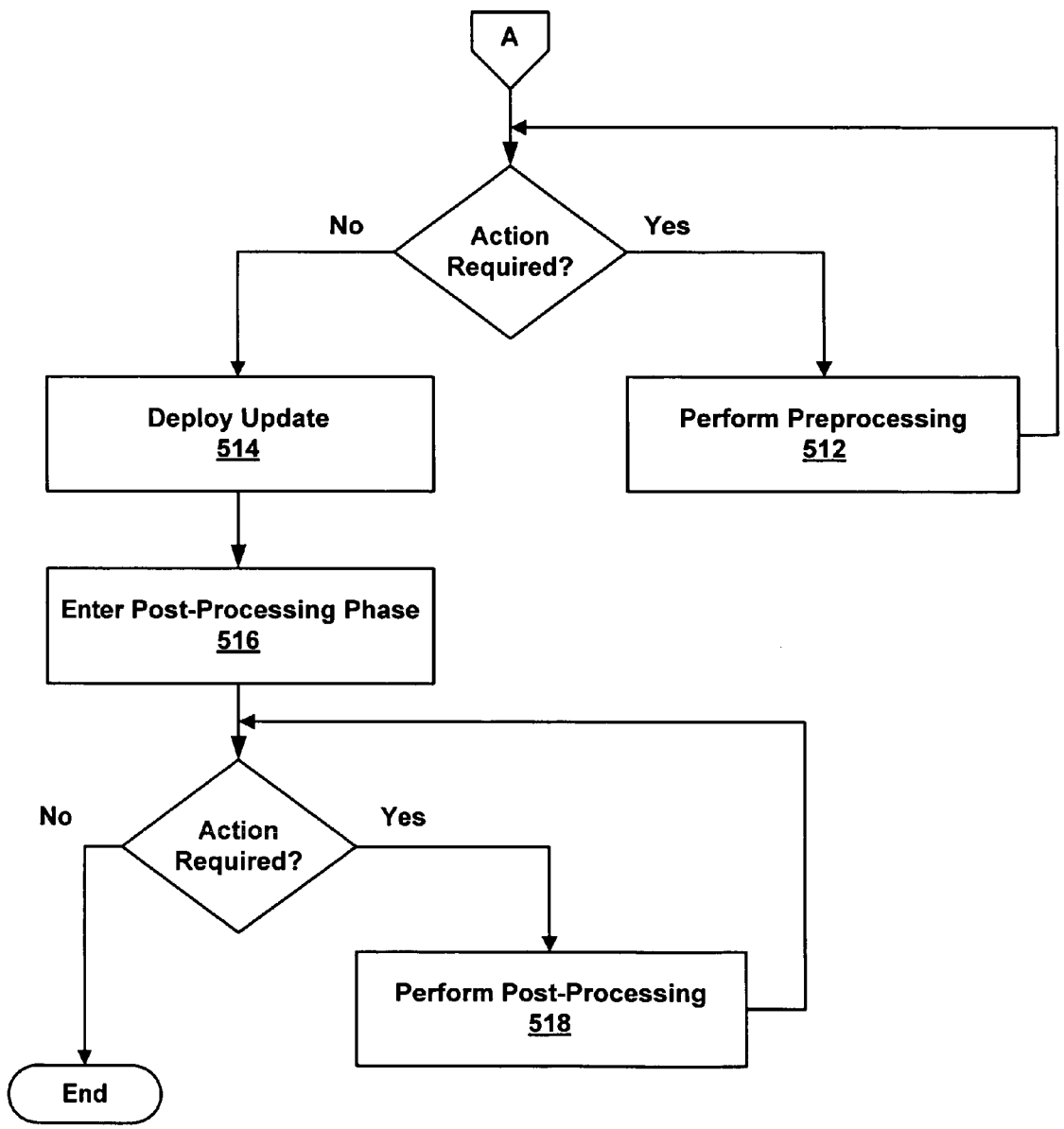

FIGS. 5A and 5B are flow diagrams of an embodiment of an update management process 500. In some embodiments, the update management process 500 can be part of an application manager system or a central control center for managing a suite of applications (e.g., a suite of business applications). In some embodiments, the process 500 includes five phases: planning, preparation, preprocessing, deployment and post-processing. Note that the process 500 is not limited to five phases and more or fewer phases can be used as desired.

In the planning phase, an IT administrator is presented with a user interface containing one or more elements for planning the deployment of a software update (502). For example, the user interface can include a planning calendar that enables the user to schedule a future deployment of one or more updates. An example user interface for such purpose is described with respect to FIG. 6.

In some embodiments, a client system user gets reference implementation times to assist in planning software maintenance updates. These implementation times may not be accurate, however, because they depend on the actual client system environment and usage, which can be different for each client system. To improve accuracy, initial estimates of implementation times can be measured during the production and validation processes at the backend system (e.g., steps 318 and 320 shown in FIG. 3). Subsequent estimates can then be measured at each client system and transferred to the backend system where they are used to determine more accurate statistically-based data reference implementation times (e.g., average implementation times) for planning purposes.

The backend system waits for to receive a download trigger from the client system (504). The trigger can be automatic in response to the occurrence of a planned event, or in response to user or system input. After receiving a download trigger, the client system enters a preparation phase (506).

In the preparation phase, the process 500 performs automatic checks to ensure the client system is prepared for the deployment phase. The automatic checks include checks to ensure the system is prepared for the installation, such as ensuring that enough memory is available for the installation, etc. After the checks are completed, a list of failed checks is displayed to the user, together with additional information and/or instructions on how to clear the failures.

In some embodiments, the user is informed that one or more preparation actions are pending before the preparation phase can be completed. If one or more preparation actions are pending, the user can use the instructions to manually perform the preparation tasks (508). A button or other user interface element can be clicked by the user to indicate that the actions have been completed. After the preparation actions are completed, the checks are performed again to ensure that the completed actions were successful. Any unsuccessful actions are detected by the process 500 and presented to the user in the failed check list. The preparation phase continues until all actions are successful and the list of failed checks is empty.

After the preparation phase, the process 500 enters a pre-processing phase (510). The process 500 determines if there are any pending preprocessing actions to be performed prior to the deployment phase. Such preprocessing tasks can include any prerequisites to be completed prior to deployment (e.g., ensuring certain software components or files are installed prior to deployment) If no preprocessing actions are pending, then the deployment phase begins (514). Otherwise, any pending preprocessing actions are performed (512). In some embodiments, a list of preprocessing steps are presented to the user, together with procedures for manually executing the steps. In other embodiments, the preprocessing steps are automatically performed by the process 500. After all preprocessing steps are completed, the process 500 enters the deployment phase (514).

After the deployment phase is complete, the process 500 enters a post-processing phase (516). If post-processing actions are pending, then various post-processing tasks are performed (518) to ensure that the installed software runs correctly on the client system, such as running configuration scripts, diagnostic tests, etc. Otherwise, the process 500 ends.

Business downtime is defined as the time when end users cannot access the client system for business tasks/transactions, etc. It is desirable to minimize business downtime. In some embodiments, business downtime can be minimized by performing download and preparation phases during business uptime. The IT administrator can schedule the business downtime and give notice to end users. The process 500 automatically informs end users when the client system is available again (e.g., by email).

User Interface

FIGS. 6-17 are screen shots of an embodiment of a user interface (UI) for managing the software update process shown in FIG. 5. FIGS. 6-17 will now be described from the perspective of a fictitious IT administrator named "Jeff Goldblume." Note that the UIs shown in FIGS. 6-17 are exemplary. Other UIs can be used as desired, including more or fewer UIs with various numbers and types of user interface elements (e.g., links, controls, search boxes, buttons, navigation bars, filters, menus, etc.).

Planning Phase

Referring to FIG. 6, the IT administrator "Jeff" logs into a default home page, which in this particular embodiment is presented in a browser window 600. The home page is for a "deploy and change" work center that enables Jeff to view any new change requests and to perform various administration tasks relating to the change requests. Jeff can use his mouse cursor to click on an "overview" button, which results in the display of an overview window 602. In some embodiments, the overview window 602 includes multiple workload monitors, including a "patches & updates" workload monitor 604, a "technical system configuration" workload monitor and a "transport changes" workload monitor. Included in the overview window 602 is a system calendar 606 and an update monitor 608.

Listed under the patches & updates workload monitor 604 are various categories: new, running, planned, action required, failed, confirm and all open. In this example, there are two new action items under the "new" category, which is indicated by the number 2 in parenthesis. The remaining categories have no pending actions. For example, there are no patches that are running, planned or that require an action from Jeff.

The system calendar 606 shows two planned tasks: a TST technical system configuration and a PRD technical system configuration, which are scheduled for Dec. 11, 2006 and Dec. 16, 2006, respectively. In some embodiments, the planned tasks are color coded, so that Jeff can quickly determine the status of planned tasks based on the color. An example color coding scheme could be: finished: green; planned: orange; running: yellow; and failed: red. In some embodiments, Jeff can choose between multiple views (e.g., day, week, month, etc.). The system calendar 606 is currently in the "week" view, which shows the planned tasks for the current week starting Dec. 11, 2006. The update monitor 608 indicates that no updates are in progress.

Jeff wants to deal with the new items in the "patches & updates" area, so he uses his mouse cursor to select the "patches & updates" button. The browser 700 displays a "patches & updates" window 700 in response to the button being clicked, as shown in FIG. 7.

Referring to FIG. 7, the "patches & updates" window 700 includes a table 702 containing information about recommended updates (i.e., recommended software changes). In some embodiments, the table 702 includes one or more filters for controlling what data is displayed in the table 702. For example, the following filters are available to Jeff: status, system and severity. Each filter has a pull-down menu which contains several categories. The "status" filter shown in FIG. 7 includes the following status options: new, postponed, rejected, in progress, finished, failed, confirmed, etc. The "system" filter includes the system options: TS, PR, which present test and production configurations, respectively. The "severity" filter includes the following severity levels: very high, high, medium, low, etc. In this example, the filters are configured, so that two new update recommendations are displayed in the table 702 for the "TST" system, and the updates are associated with a "high" severity level. The update recommendations are described as follows: "Update: Update to maintenance level 3 recommended for A1S solution" and "Update: Update to maintenance level 4 recommended for A1S solution." These update recommendations were determined at the backend system 104 and pushed to the client system 102, as described with respect to FIG. 3.

In this example, Jeff chooses to execute the first task immediately. Jeff could start the deployment at once, but he wants to check the details of the first task before proceeding. Therefore, he clicks the "subject" field in the table 702 and is presented with a window 800 that includes an update description area 802 for the first task, as shown in FIG. 8.

Figure 8:
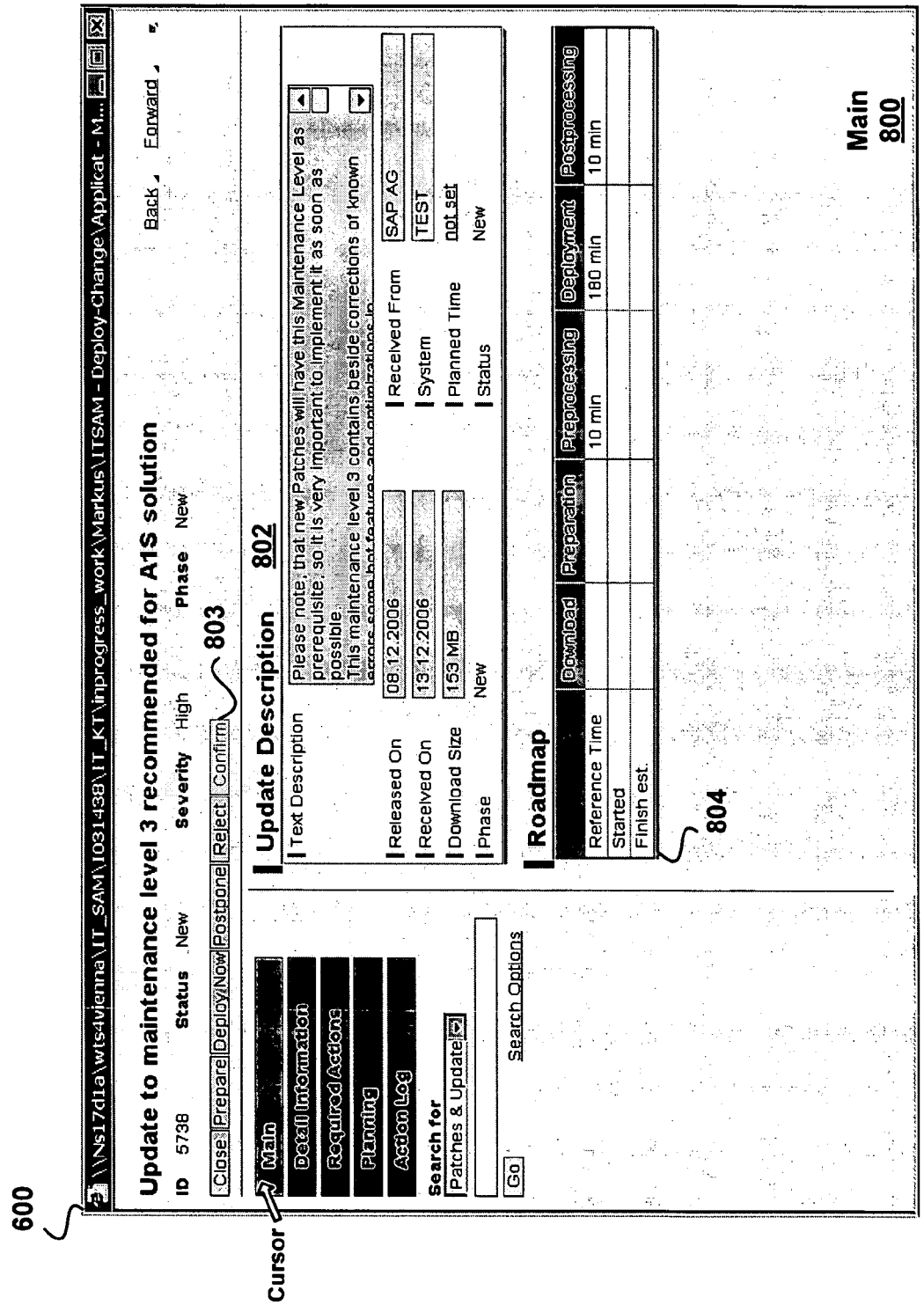

Referring to FIG. 8, the update description area 802 includes but is not limited to: a text description of the first task, a release date for the first task, a received date indicating when the recommendation was received, a phase field (e.g., new), a "received from" field indicating the source of the recommendation (e.g., the name of a service provider), a system field (e.g., TST system) and a "planned time" field for indicating when the first task will be initiated. Note that the "planned time" field currently displays "not set" since Jeff has not yet set a time to execute the first task (i.e., update to maintenance level 3).

Thus, the update description area 802 includes a text description that warns Jeff that "new patches will have this Maintenance Level as a prerequisite, so it is very important to implement it as soon as possible."

Also included in the window 800 is a roadmap table 804, which includes a roadmap for deploying the updates. The rows of the roadmap table 804 can include but are not limited to: a reference time and start and estimated finish times for starting and completing the deployment of the first task. The columns of table 804 can include the various phases of deployment, including but not limited to the following phases: download, preparation, preprocessing, deployment and post-processing. Thus, the table 804 indicates that the preprocessing phase will take 10 minutes, the deployment phase will take 180 minutes and the post-processing phase will take 10 minutes. Jeff decides to plan the update for the first task at a later time and clicks the "Planning" bar, which results in a new window 900 being displayed.

Figure 9:
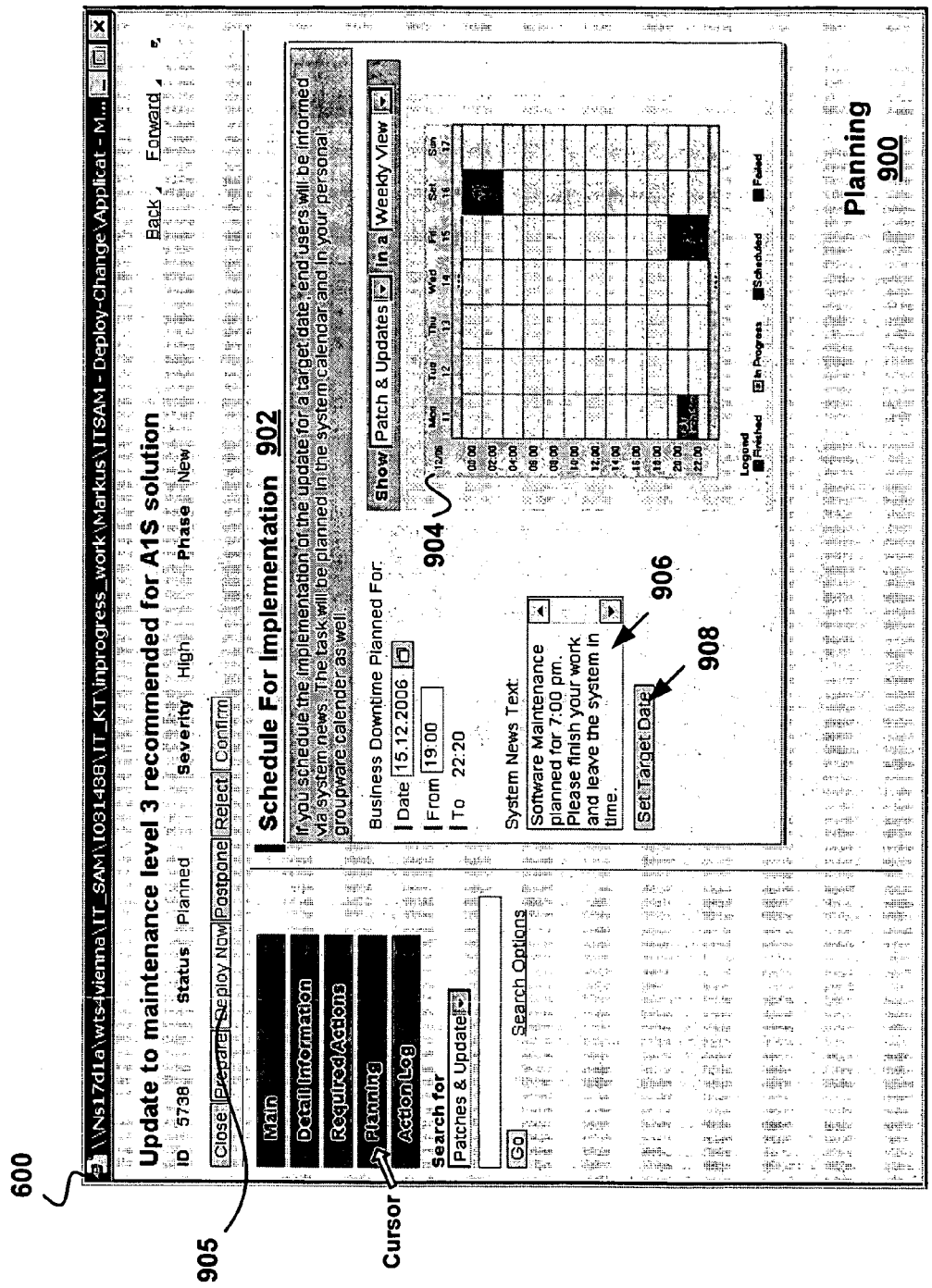

Referring to FIG. 9, the window 900 includes a planning view 902 containing a system calendar 904 and a text box 906. The planning view 902 also includes time, date and system message fields. In this example, Jeff enters a date (Dec. 15, 2006) and time (19:00) in the date and time fields, respectively, and a broadcast message in the text box 806 ("Software Maintenance planned for 7:00 pm. Please finish your work and leave the system in time."). Jeff then clicks the set target date button 908. The system calendar 904 is updated to reflect that the new task is scheduled for deployment on Dec. 15, 2006, from 19:00 to 1:15 and is also color coded to reflect the "scheduled" status (e.g., orange). Next, Jeff returns to the main screen (FIG. 8) by clicking the "Main" bar.

Figure 10:
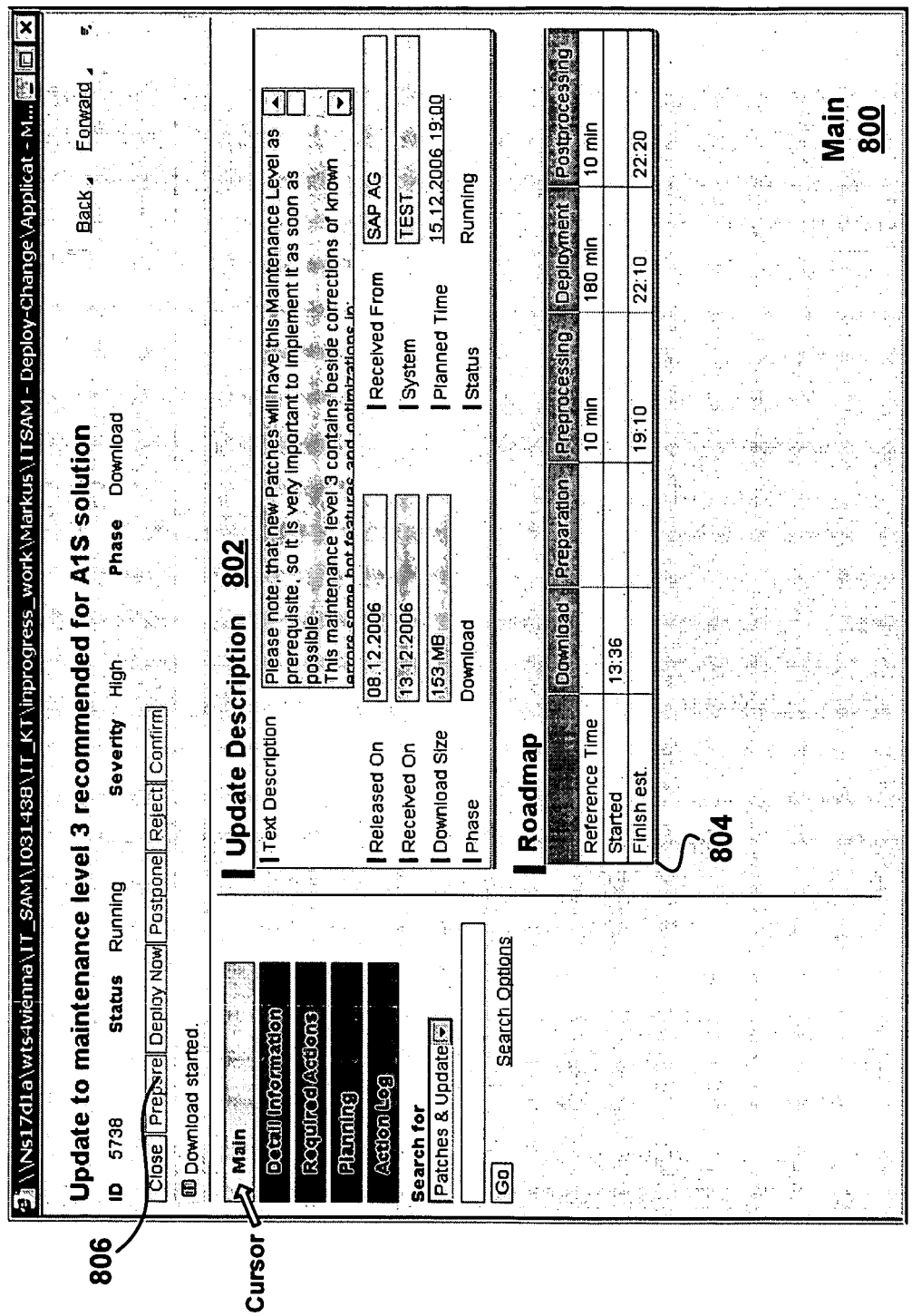

Referring to FIG. 10, the main window 800 is again displayed with one or more fields in the update description area 802 and a roadmap table 804 occupied with values reflecting Jeff's deployment planning. For example, the planned time field in the update description area 802 now reads 15.12.2006 19:00. Also, the bottom row of the roadmap table 804 now reads estimated finish times for preprocessing (19:10), deployment (22:10) and post-processing (22:20). Jeff decides to prepare the deployment now by pressing the "prepare" button 806. Because the preparation starts with the download of updates which takes sometime, Jeff can leave work and return sometime later.

Figure 11:
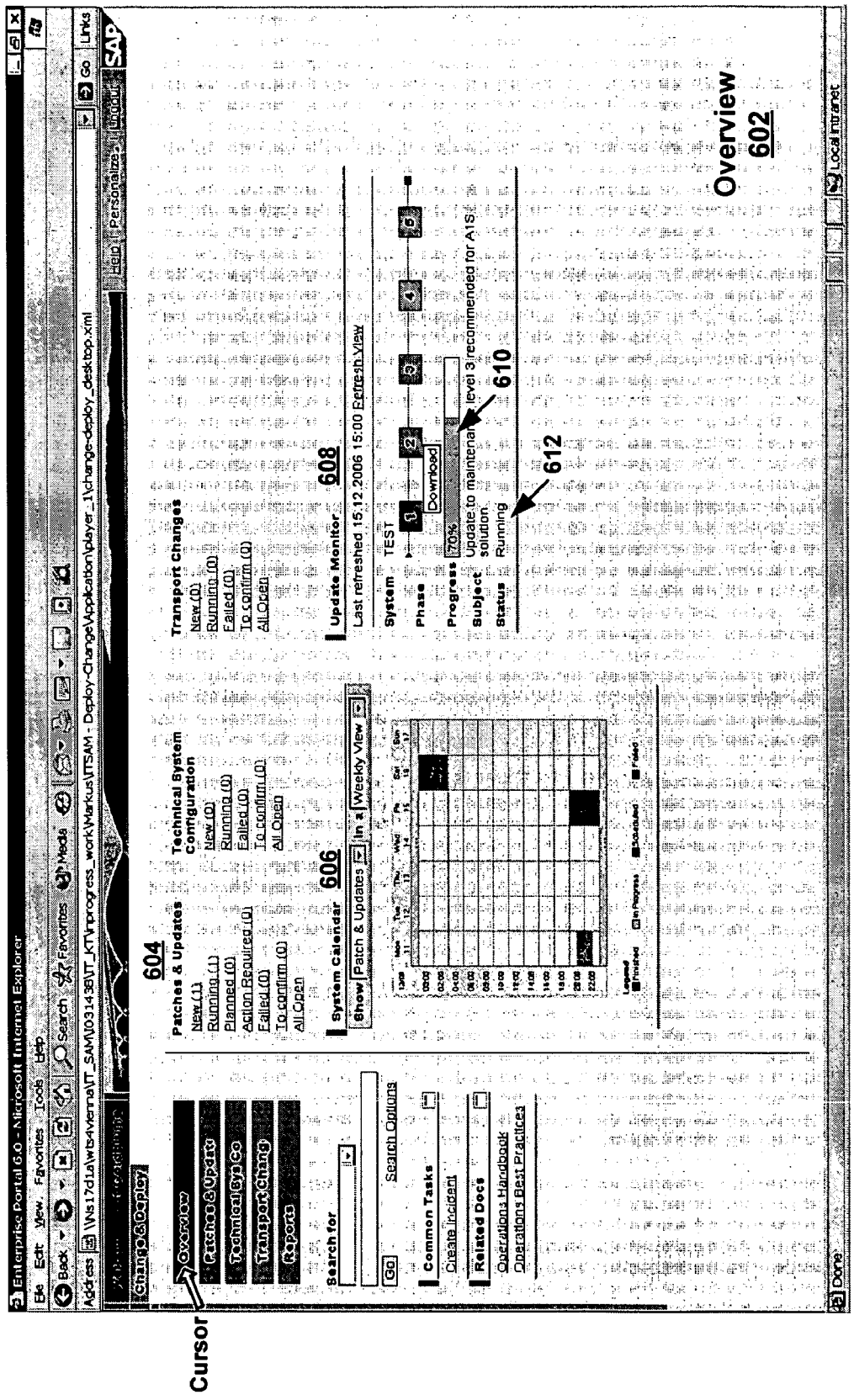

When Jeff returns he again clicks the "overview" button and the overview window 600 is displayed, as shown in FIG. 11. The system calendar 606 now reflects the scheduling of the first task and the patches & update monitor reflects that one new item and one item that is running (i.e., the first update task to maintenance level 3). Because the task is running, the update monitor 608 now displays progress indicators (e.g., bar graph, flow diagram, meter, etc.). In this example, the current task is about 70% complete as indicated by the bar graph 610. Note that a status field 612 in the update monitor 608 indicates that the task is running.

Figure 12:
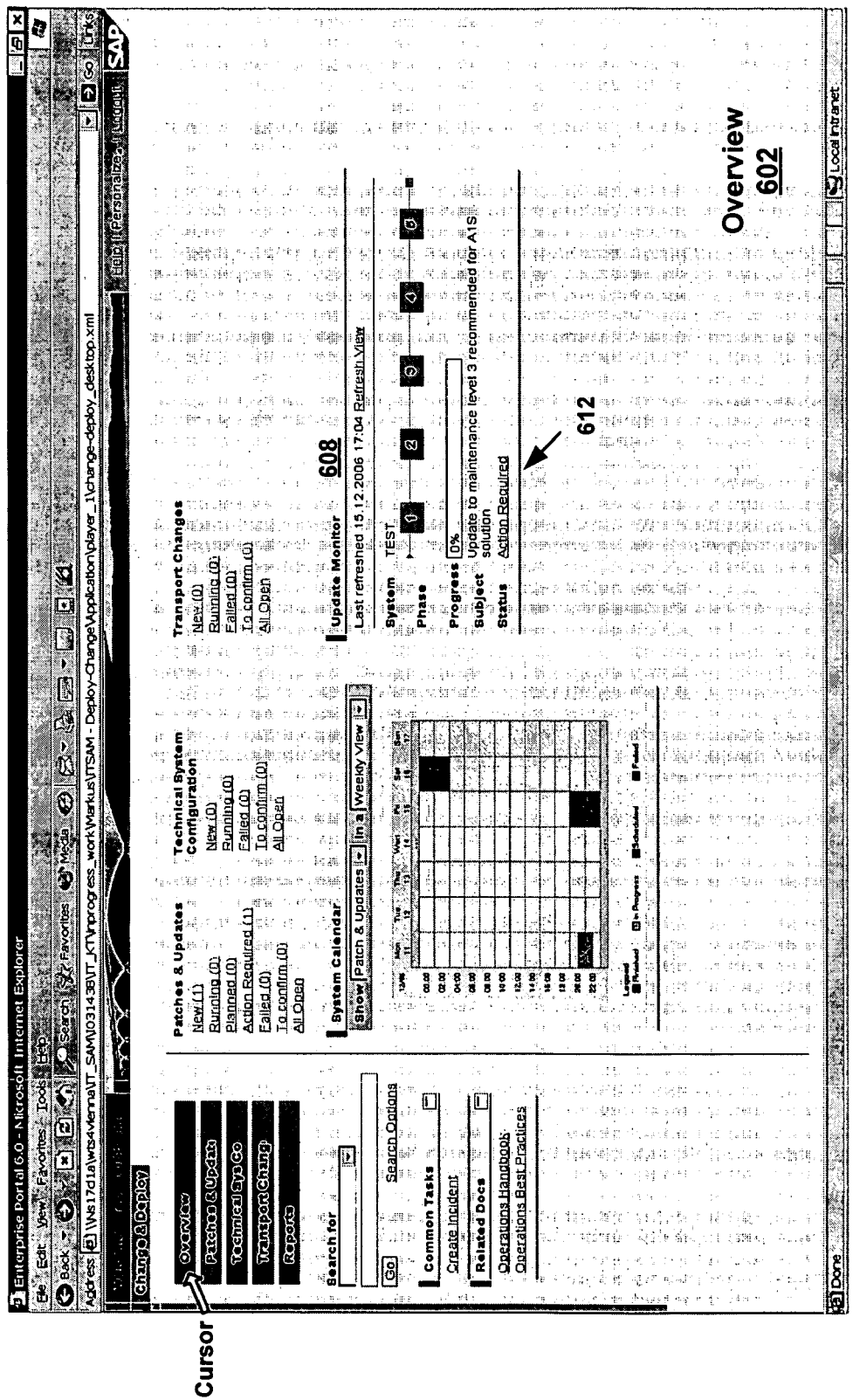
Figure 13:
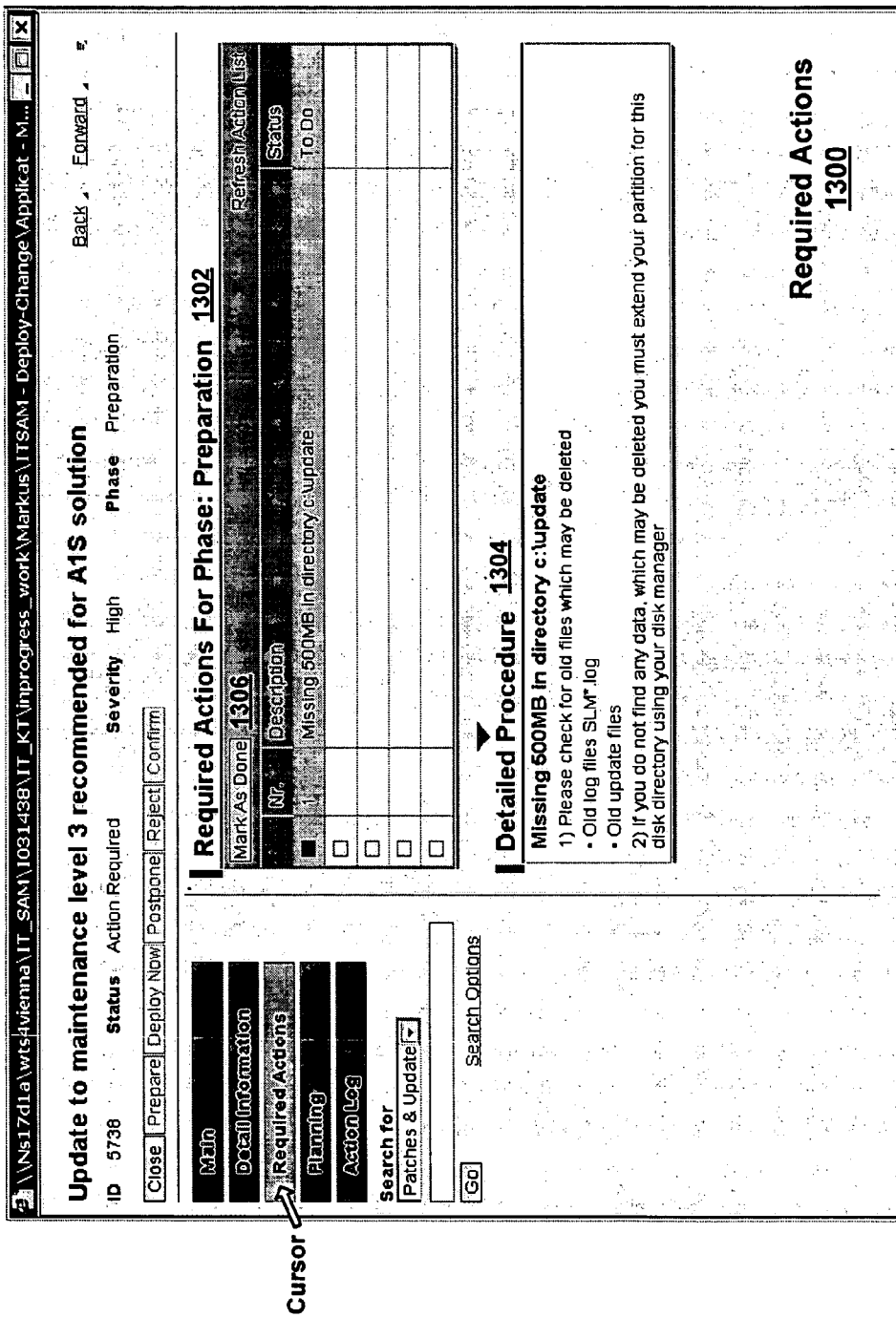

After the download phase (i.e., phase 1) completes, the status field 612 changes from "running" to "action required," and the workload monitor 604 is updated to reflect this state change, as shown in FIG. 12. Jeff clicks on a link in the status field 612, resulting in the display of a required actions window 1200, as shown in FIG. 13. In some embodiments, the phases for the current task are indicated by the numbered boxes displayed in update monitor 608, and the boxes are highlighted or change color to reflect the current phase.

Preparation Phase

Referring to FIG. 13, the required actions window 1300 includes a required actions table 1302 and a detailed procedure field 1304. There is one preparation task to be performed and that task is highlighted, e.g., "Missing 500 MB in directory c:\update." The detailed procedure field 1304 provides a instructions for performing the highlighted preparation task. For this example, the procedure description is: (1) Check for old files which may be deleted (old log files, old update files), and (2) if you do not find any data, which may be deleted you must extend your partition for this disk directory using your disk manager." Other preparation tasks include, but are not limited to, checking for operation system configuration, missing hardware or software resources, etc.

Figure 14:
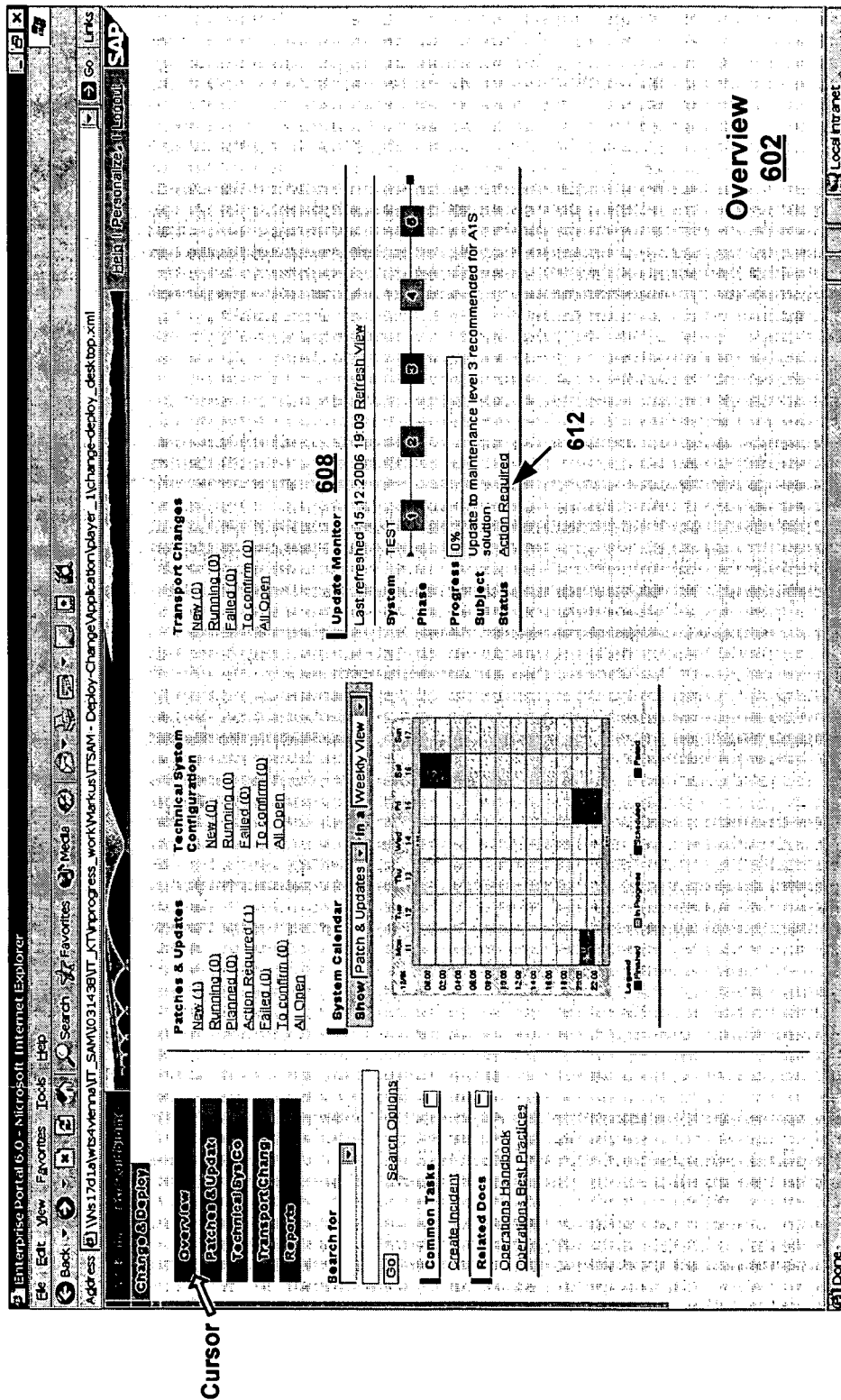

In this example, Jeff already has completed the manual procedure described above, and so he clicks on the "Mark as Done" button 1306 to complete the preparation phase of the update process (i.e., phase 2). The system then proceeds to a preprocessing phase (phase 3) and the status field 612 indicates that an "action is required" for this phase, as shown in FIG. 14. Jeff clicks on the link in the status field 612, which results in a required actions window 1300 being displayed, as shown in FIG. 15.

Preprocessing Phase

Figure 15:
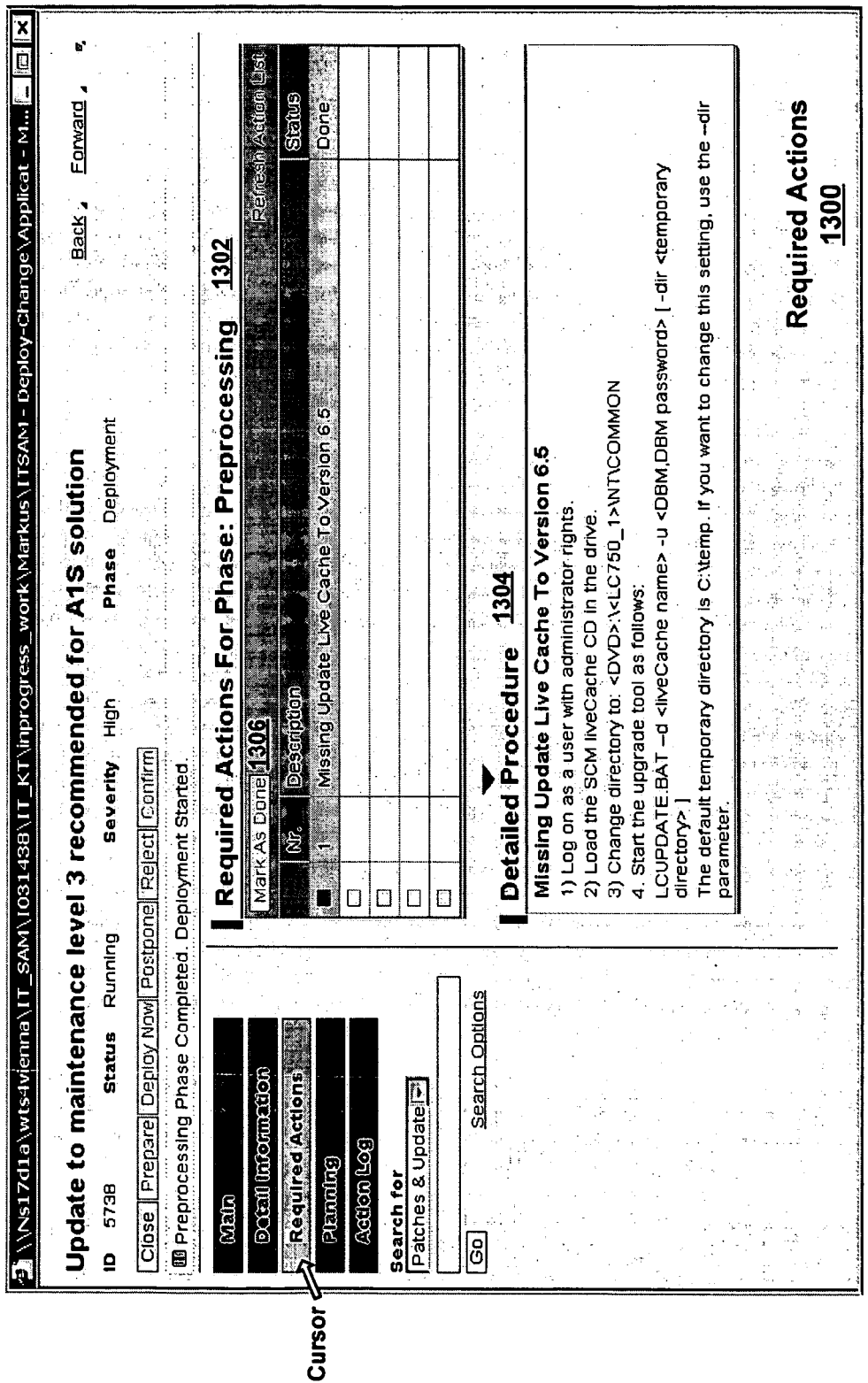
Figure 16:
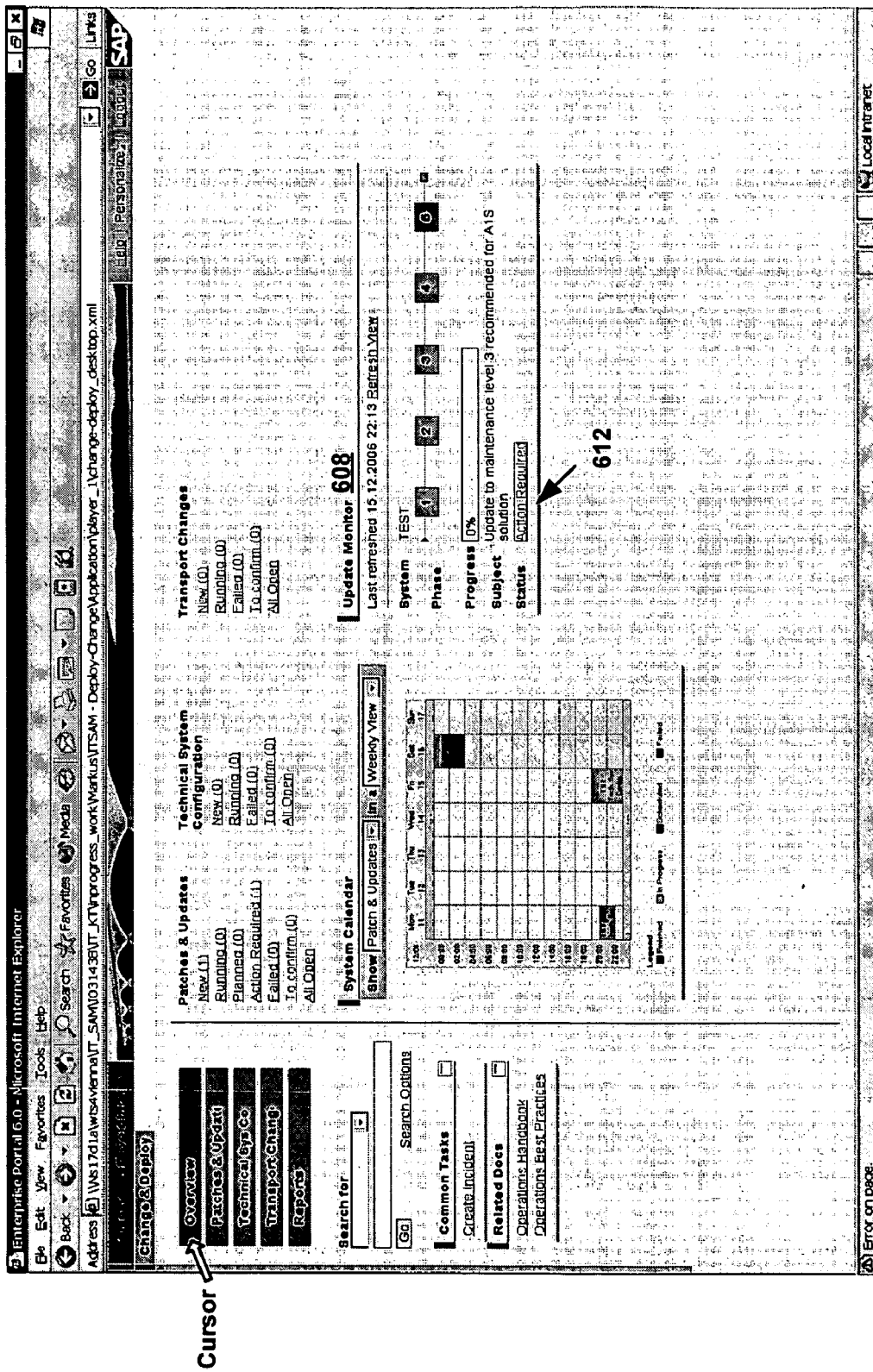
Figure 17:
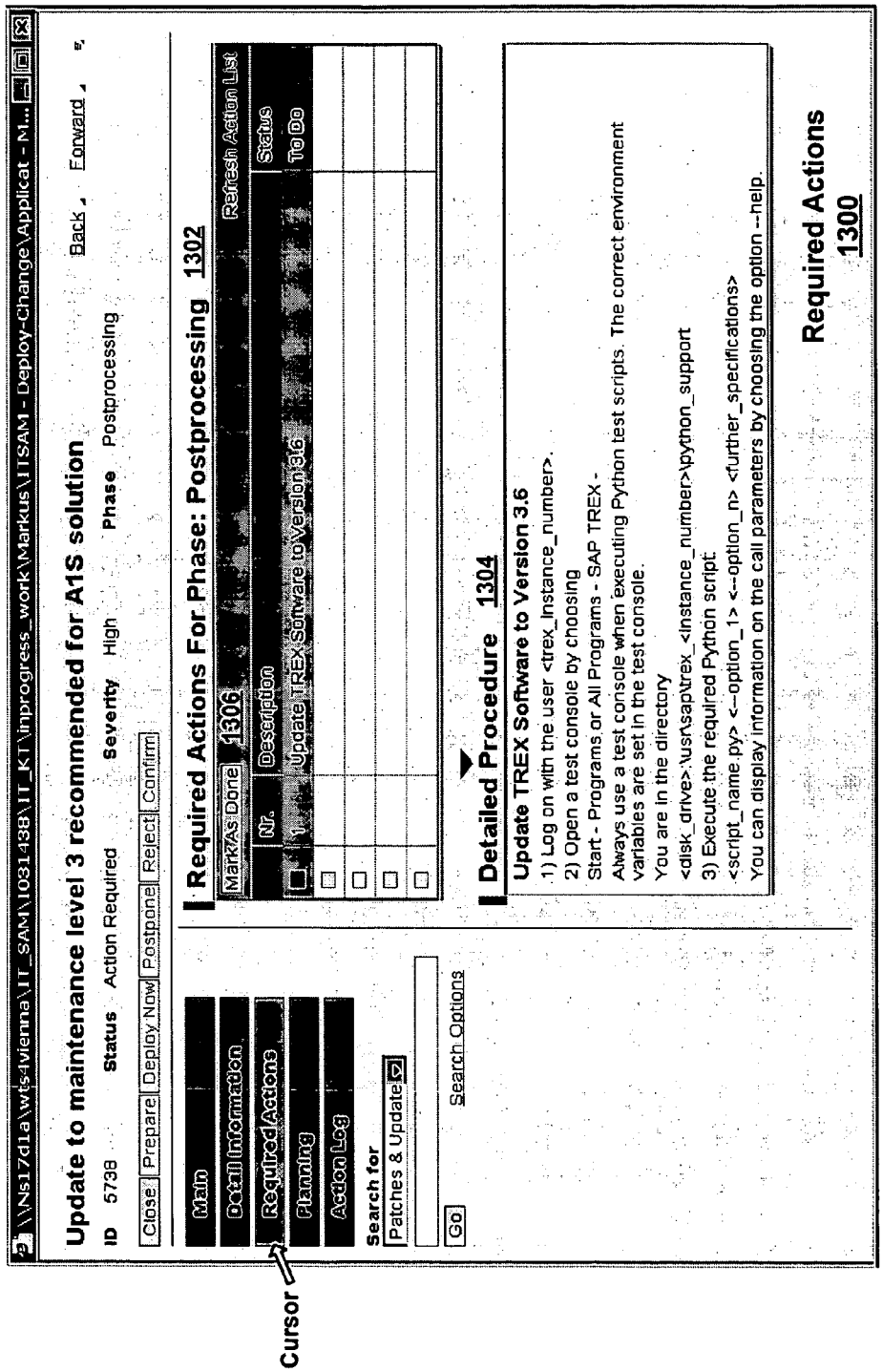

Referring to FIG. 15, the required actions window 1300 includes a required actions table 1402, which lists a single preprocessing task that is highlighted. In this example, the preprocessing task description is: "Missing Update Live Cache to Version 6.5." The detailed procedure field 1304 provides instructions for manually performing the highlighted preprocessing task. Jeff selects the "Mark As Done" button 1306 because he has already performed the task. The system then enters a deployment phase (phase 4), and the status field 612 indicates that an "action is required" for the deployment phase, as shown in FIG. 16. Jeff clicks on the link in the status field 612, which results in a required actions window 1300 being displayed, as shown in FIG. 17. Preprocessing tasks include, but are not limited to, all manual tasks that are not automated (e.g., installing the correct version of third party software, etc.).

Post-Processing Phase

Referring to FIG. 17, the required actions window 1300 includes a required actions table 1302, which lists a single post-processing task that is highlighted. In this example, the post-processing task description is: "Update TREX Software to Version 3.6." The detailed procedure field 1304 provides instructions for manually performing the highlighted task. Jeff selects the "Mark As Done" button 1306 because he has performed the post-processing task. The update process is now complete. Other post-processing tasks can include, but are not limited to, changes to the configuration to activate new features, enhancements to existing features, etc.

Client System Architecture

Figure 18:
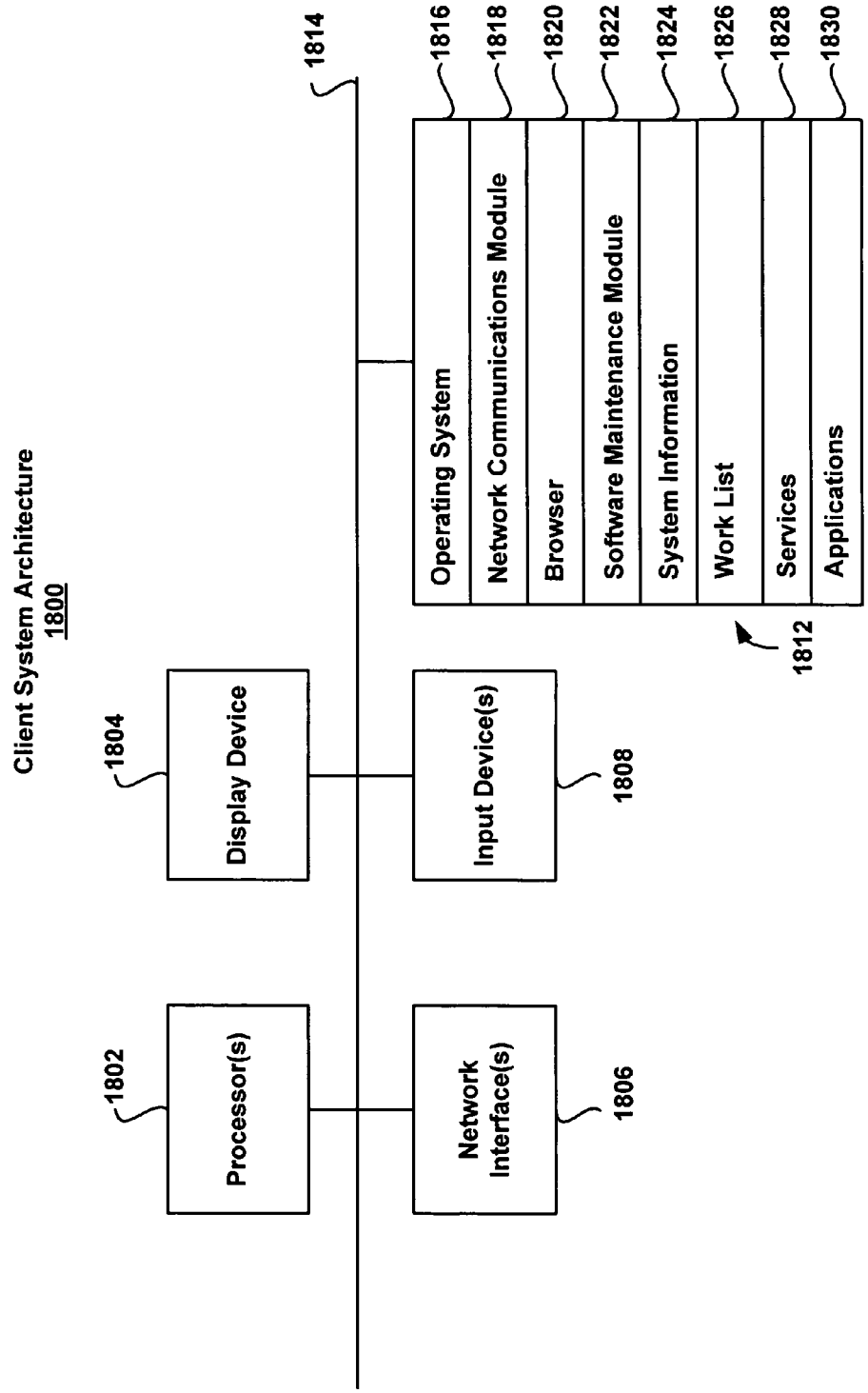
FIG. 18 is a block diagram of an embodiment of a client system architecture.

FIG. 18 is a block diagram of an embodiment of a client system architecture 1800 for software maintenance management. The architecture 1800 includes one or more processors 1802 (e.g., CPU), a display device 1804 (e.g., CRT, LCD, etc.), one or more network interfaces 1806 (e.g., Ethernet, etc.), one or more input devices 1808 (e.g., mouse, keyboard, etc.) and one or more computer-readable mediums 1812. Each of these components is coupled by one or more buses 1814 (e.g., EISA, PCI, etc.). The term "computer-readable medium" refers to any medium that participates in providing instructions to the processor 1802 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1812 further includes an operating system 1816 (e.g., Windows®, Unix, Linux, etc.), a network communications module 1818, a browser 1820, a software maintenance module 1822, system information, a work list, services 1828 and one or more applications 1820 (e.g., a suite of business applications). The operating system 1816 can be multi-user, multiprocessing, multitasking, multithreading, real-time and the like. The operating system 1816 performs basic tasks, including but not limited to: recognizing input from input devices 1808; sending output to the display device 1804; keeping track of files and directories on storage devices 1812; controlling peripheral devices (e.g., disk drives, printers, etc.); and managing traffic on the one or more buses 1814.

The network communications module 1818 includes various components for establishing and maintaining network connections (e.g., software for implementing communication protocols, such as TCP/IP, HTTP, Ethernet, etc.).

The browser is used to display the various user interfaces shown in FIGS. 6-17. The software maintenance module 1820 provides various software components for performing processes described with respect to FIGS. 1-17. In some implementations, some or all of the processes performed by the software maintenance module 1820 can be integrated into the operating system 1816. One or more components of architecture 1800 can be implemented in digital electronic circuitry, or in computer hardware, firmware, software, or in any combination thereof.

The system information 1824 includes configuration and status data describing the current state of the installed software. The work list is described with respect to FIG. 6. Services 1828 include data collection and monitoring services, which notify the backend system of any software changes, failures or any other events occurring at the client system. Applications 1830 can include any software applications, such as business applications, word processors, email applications, Instant Messaging, media players, telephony software, etc.

Backend System Architecture

Figure 19:
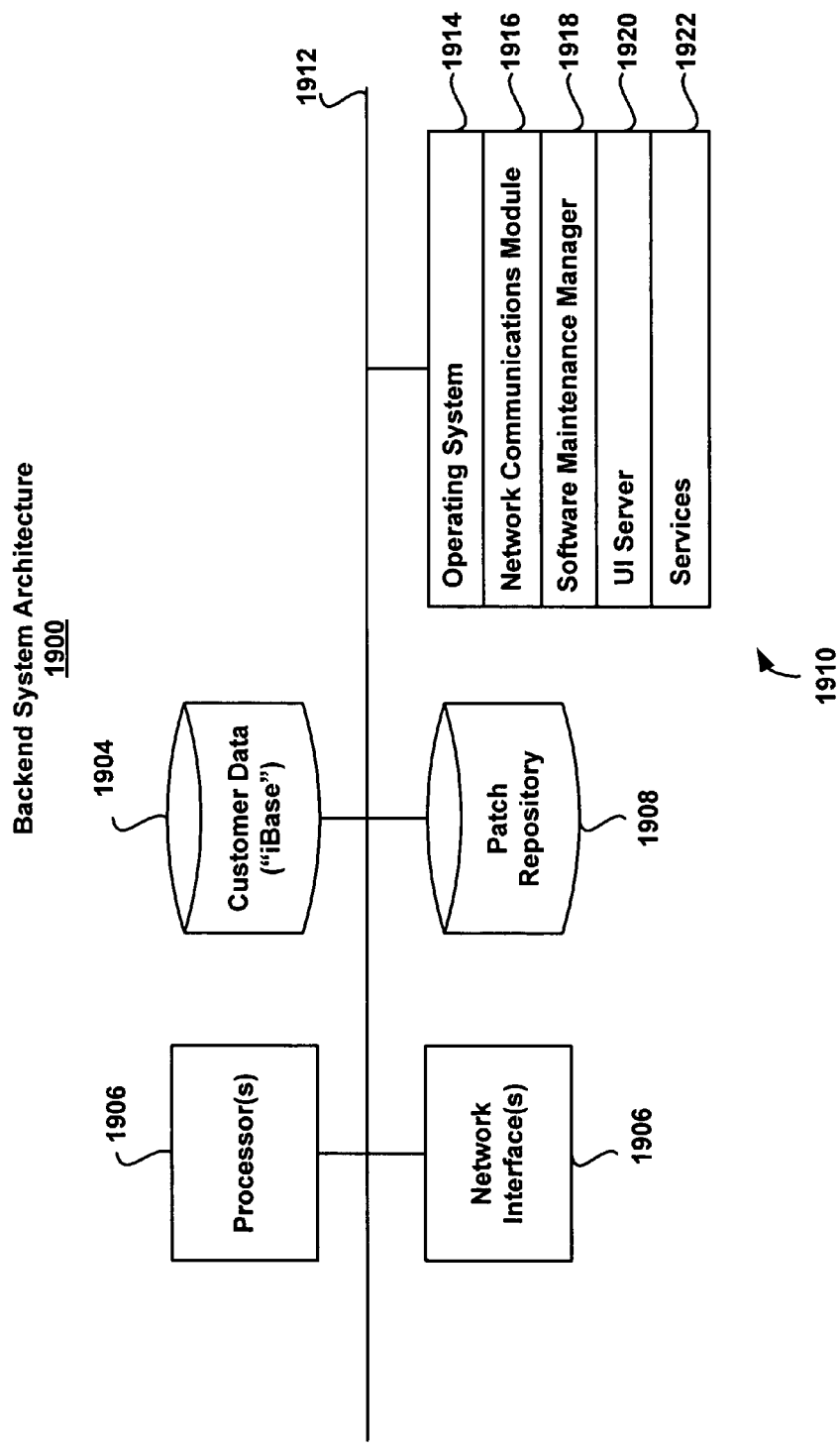
FIG. 19 is a block diagram of an embodiment of a backend system architecture.

FIG. 19 is a block diagram of an embodiment of a backend system architecture 1900. The architecture 1900 includes one or more processors 1902 (e.g., CPU), a client system information repository 1904 (e.g., a customer database and/or directory), one or more network interfaces 1906 (e.g., Ethernet, etc.) and one or more computer-readable mediums 1908. Each of these components is coupled to one or more buses or networks 1910.

The computer-readable medium(s) 1912 further includes an operating system 1914 (Windows NT®, Unix, Linux, etc.), a network communications module 1916, a software maintenance manager 1918 a UI server 1920 and one or more services 1922. The operating system 1914 can be multi-user, multiprocessing, multitasking, multithreading, real-time and the like. The operating system 1914 performs basic tasks, including keeping track of files and directories on storage devices 1904, 1908, and managing traffic on one or more buses 1910, etc.

The network communications module 1916 includes various components for establishing and maintaining network connections with a client system (e.g., software for implementing communication protocols, such as TCP/IP, HTTP, Ethernet, XML, etc.). The software maintenance manager 1918 provides various software components for performing processes described with respect to FIGS. 1-17. In some implementations, some or all of the processes performed by the software maintenance manager 1918 can be integrated into the operating system 1916. The UI server 1920 generates a user interface for presentation at a client system (e.g., a web server). The one or more services 1922 include various services for performing the tasks described with respect to FIGS. 1-17, including a download manager for downloading updates to the client system. One or more components of architecture 1900 can be implemented in digital electronic circuitry, or in computer hardware, firmware, software, or in any combination thereof.

Various modifications may be made to the disclosed embodiments and still be within the scope of the following claims.

What is claimed is:

1. A computer-implemented method of updating software installed on a computing device, comprising:
  receiving an incident report from the computing device describing a problem identified by the computing device and involving software installed on the computing device, the incident report including system information describing configuration of the software on the computing device;
  updating a maintained repository of system information using the received system information, the repository storing system information for a plurality of disparate computing devices;
  determining at least one update recommendation, wherein at least one update recommendation is based on information from the updated repository and the problem described in the incident report;
  sending at least one update recommendation to the computing device, the update recommendation including update information pertaining to at least one software update associated with the update recommendation, the update information identifying an estimated time duration for deploying the software update, the estimated time duration based on statistical data from previous deployments of software updates on computing devices in the system, the estimated time duration including one or more time duration phases associated with the update recommendation; and
  automatically downloading to the computing device the at least one software update associated with the update recommendations in response to a trigger event at the computing device.

2. The method of claim 1, wherein determining includes:
  determining at least one update recommendation in response to new updates available to the system.

3. The method of claim 1, wherein determining includes:
  determining at least one update recommendation in response to changes occurring at the system.

4. The method of claim 1, further comprising:
scheduling a date and time for downloading the updates; and
downloading the updates at the scheduled date and time.

5. The method of claim 4, wherein scheduling includes scheduling the date and time based on the identified estimated time duration.

6. The method of claim 1, further comprising:
automatically preparing the system for deploying the downloaded software updates.

7. The method of claim 1, further comprising:
performing at least one preprocessing task prior to deploying the downloaded software updates.

8. The method of claim 7, wherein preprocessing further comprises:
automatically checking for prerequisite tasks;
providing notification of the prerequisite tasks; and
providing instructions for manually performing the prerequisite tasks.

9. The method of claim 1, wherein a corresponding time duration of each time duration phase of the one or more time duration phases is estimated based on the statistical data from previous deployments of software updates on computing devices in the system.

10. The method of claim 1, wherein the one or more time duration phases are selected from the group consisting of download, preparation, pre-processing, deployment, and post-processing.

11. A computer-implemented method of updating software installed on a computing device, comprising:
transmitting an incident report to a remote backend system that includes a repository of system information for a system including a plurality of disparate computing devices, the incident report describing a problem identified by the computing device and involving software installed on the computing device, the incident report including system information describing configuration of the software on the computing device;
receiving from the backend system at least one software update recommendation in response to the transmitted incident report, the recommendation based on information from the repository of system information and the problem described in the incident report, the recommendation including update information pertaining to at least one software update associated with the recommendation, the update information identifying an estimated time duration for deploying the software update, the estimated time duration based on statistical data from previous deployments of software updates on computing devices in the system, the estimated time duration including one or more time duration phases associated with the update recommendation;
scheduling a date and time for downloading to the system at least one software update associated with the update recommendation;
at the scheduled date and time, automatically downloading to the system the software update; and
automatically deploying the software update.

12. The method of claim 11, wherein deploying includes:
determining if there are any tasks to be completed prior to deployment;
performing the tasks; and
automatically deploying the software updates.

13. The method of claim 12, where performing includes manually performing the tasks based on instructions automatically provided by the system.

14. The method of claim 11, further comprising:
scheduling the date and time for downloading the updates; and
downloading the updates at the scheduled date and time.

15. The method of claim 14, wherein scheduling includes scheduling the date and time based on statistical information, the statistical information based on previous deployments of software updates on computing devices in the system.

16. The method of claim 11, further comprising:
automatically preparing the system for deploying the downloaded software updates.

17. The method of claim 11, further comprising:
performing at least one preprocessing task prior to deploying the downloaded software updates.

18. The method of claim 11, wherein scheduling a date and time for downloading software updates includes:
presenting an interactive graphical interface on a display device, the graphical interface presenting the update information;
receiving, through the graphical interface, an indication of the date and time for downloading to the system the at least one software update associated with the update recommendation.

19. A computer program product, tangibly embodied in a non-transitory, machine-readable medium, comprising instructions that, when executed, cause a processor to perform operations comprising:
receiving an incident report from the computing device describing a problem involving software installed on the system, the incident report including system information describing configuration of the software on the computing device;
updating a maintained repository of system information using the received system information, the repository storing system information for a plurality of disparate computing devices;
determining at least one update recommendation, wherein at least one update recommendation is based on information from the updated repository and the problem described in the incident report, the update recommendation including update information pertaining to at least one software update associated with the recommendation, the update information identifying an estimated time duration for deploying the software update, the estimated time duration based on statistical data from previous deployments of software updates on computing devices in the system, the estimated time duration including one or more time duration phases associated with the update recommendation;
sending at least one update recommendation to the computing device; and
automatically downloading to the computing device at least one software update associated with the update recommendations in response to a trigger event at the computing device.

20. A computer-implemented method of updating software installed on a computing device, comprising:
receiving an incident report from the computing device describing a problem identified by the computing device and involving software installed on the computing device, the incident report including system information describing configuration of the software on the computing device;
updating a maintained repository of system information using the received system information, the repository storing system information for a plurality of disparate computing devices;

determining at least one update recommendation, wherein at least one update recommendation is based on information from the updated repository and the problem described in the incident report;

sending at least one update recommendation to the computing device, the update recommendation including update information pertaining to at least one software update associated with the update recommendation, the update information identifying an estimated time duration for deploying the software update, the estimated time duration based on statistical data from previous deployments of software updates on computing devices in the system, the estimated time duration including one or more time duration phases associated with the update recommendation, wherein a corresponding time duration of each time duration phase of the one or more time duration phases is estimated based on the statistical data from previous deployments of software updates on computing devices in the system; and automatically downloading to the computing device the at least one software update associated with the update recommendations in response to a trigger event at the computing device.

21. The method of claim 20, wherein the one or more time duration phases are selected from the group consisting of download, preparation, pre-processing, deployment, and post-processing.

* * * * *